United States Patent
Fujiwara et al.

(10) Patent No.: US 7,522,243 B2
(45) Date of Patent: Apr. 21, 2009

(54) DISPLAY DEVICE AND METHOD FOR FABRICATING THE DISPLAY DEVICE

(75) Inventors: Sayuri Fujiwara, Nara (JP); Yutaka Sawayama, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 59 days.

(21) Appl. No.: 10/373,045

(22) Filed: Feb. 26, 2003

(65) Prior Publication Data

US 2003/0164915 A1 Sep. 4, 2003

(30) Foreign Application Priority Data

Mar. 1, 2002 (JP) ............................. 2002-055827

(51) Int. Cl.
*G02F 1/1343* (2006.01)
*G02F 1/1335* (2006.01)

(52) U.S. Cl. .................... 349/139; 349/113; 349/138

(58) Field of Classification Search ............... 349/113, 349/122, 128–129
See application file for complete search history.

(56) References Cited

U.S. PATENT DOCUMENTS

| | | | |
|---|---|---|---|
| 3,905,682 A | 9/1975 | Meyerbhofer | 349/113 |
| 4,601,861 A | 7/1986 | Pricone et al. | 264/1.6 |
| 5,166,085 A * | 11/1992 | Wakai et al. | 438/158 |
| 5,182,663 A | 1/1993 | Jones | 349/113 |
| 5,949,507 A | 9/1999 | Shimada et al. | 349/113 |
| 6,313,900 B1 * | 11/2001 | Kawata | 349/153 |
| 6,373,539 B1 | 4/2002 | Tsuda | 349/113 |
| 6,388,723 B1 * | 5/2002 | Iida et al. | 349/111 |
| 6,407,784 B1 * | 6/2002 | Kanou et al. | 349/113 |
| 6,657,766 B2 * | 12/2003 | Minoura et al. | 359/263 |
| 7,098,976 B2 * | 8/2006 | Minoura et al. | 349/113 |
| 2001/0040717 A1 | 11/2001 | Minoura et al. | 359/263 |
| 2002/0000613 A1 | 1/2002 | Ohtani et al. | 257/59 |

FOREIGN PATENT DOCUMENTS

| | | |
|---|---|---|
| JP | 3-186816 | 8/1991 |
| JP | 4-220625 | 8/1992 |
| JP | 7-205322 | 8/1995 |
| JP | 9-076245 | 3/1997 |
| JP | 10-293321 | 11/1998 |

(Continued)

OTHER PUBLICATIONS

Neudeck, G. et al; "Precision Crystal Corner Cube Arrays for Optical Gratings Formed By (100) Silicon Planes With Selective Epitaxial Growth"; Applied Optics, vol. 35, No. 19,. Jul. 1, 1996, pp. 3466-3470.

(Continued)

*Primary Examiner*—Dung T. Nguyen
(74) *Attorney, Agent, or Firm*—Nixon & Vanderhye P.C.

(57) ABSTRACT

A display device includes a substrate, a circuit element, an interlayer film, and an electrode. The circuit element is provided on the substrate. The interlayer film is provided over the circuit element and includes an interlevel dielectric layer and an interconnecting member that runs through the interlevel dielectric layer. The electrode is provided on the interlayer film. The electrode and the circuit element are electrically connected together by way of the interconnecting member. The electrode on the interlayer film has a substantially uniform surface shape.

14 Claims, 15 Drawing Sheets

FOREIGN PATENT DOCUMENTS

| | | |
|---|---|---|
| JP | 11-072799 | 3/1999 |
| JP | 11-125831 | 5/1999 |
| JP | 11-202368 | 7/1999 |
| JP | 11-287989 | 10/1999 |
| JP | 2000-19490 | 1/2000 |
| JP | 2000-147552 | 5/2000 |
| JP | 2000-250027 | 8/2000 |

OTHER PUBLICATIONS

U.S. Appl. No. 10/171,651, filed Jun. 17, 2002 entitled "Micro Corner Cube Array, Method of Making the Micro Corner Cube Array and Reflective Type Display Device".

Korean Office Action mailed May 30, 2005 (w/partial English translation thereof).

* cited by examiner

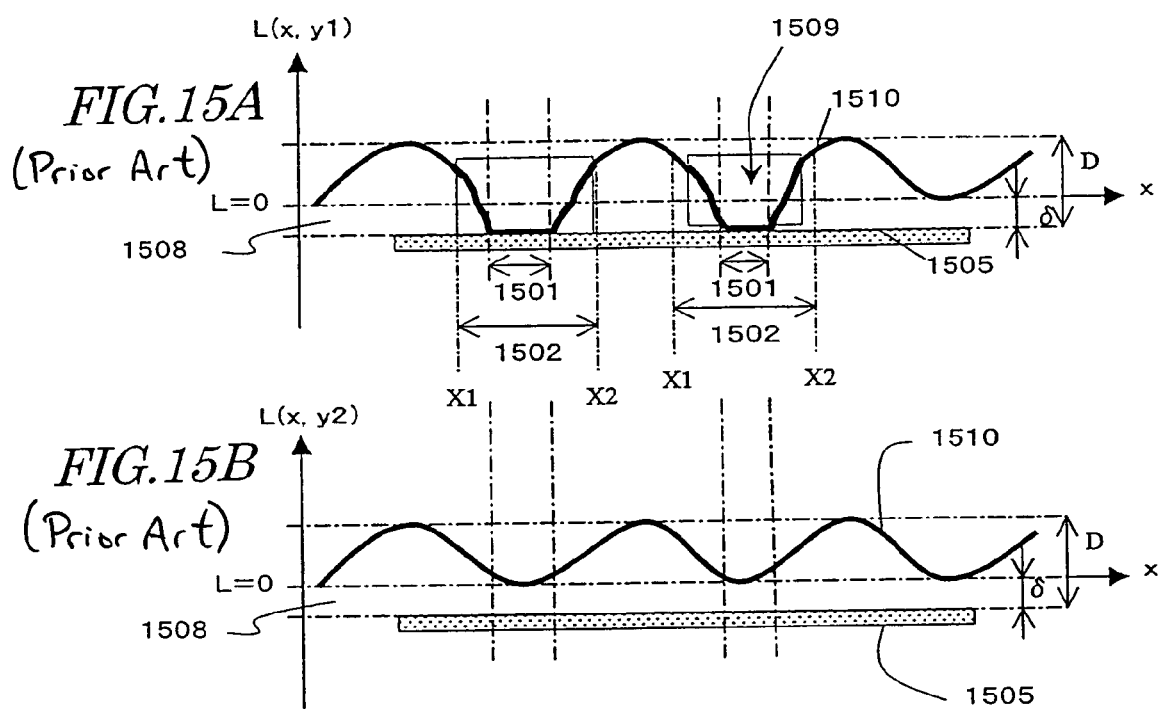

DISPLAY DEVICE AND METHOD FOR FABRICATING THE DISPLAY DEVICE

BACKGROUND OF THE INVENTION

1. Field of the Invention

The present invention relates to a display device and a method for fabricating the display device.

2. Description of the Related Art

Recently, flat-panel displays (FPDs) such as liquid crystal displays (LCDs) have been used extensively. Also, so-called "electronic paper" display devices having a further reduced thickness have been researched and developed.

A liquid crystal display device conducts a display operation by utilizing variations in the electro-optical properties of its liquid crystal layer. Such variations are caused by liquid crystal molecules that change their orientation directions in response to an electric field applied thereto. The electric field is normally applied to the liquid crystal layer by creating a voltage between a pair of electrodes that faces each other with the liquid crystal layer interposed between them. The structure of that pair of electrodes for use to apply the electric field to the liquid crystal layer is changeable with the specific mode of operation of the liquid crystal display device.

A typical electrode structure will be described with respect to a reflective active-matrix-addressed liquid crystal display device as an example. In an active-matrix-addressed liquid crystal display device, the pair of electrodes for use to apply an electric field to its liquid crystal layer normally includes a pixel electrode, which is provided on an active-matrix substrate, and a counter electrode, which is provided so as to face the pixel electrode.

A reflective liquid crystal display device includes a reflective layer to conduct a display operation by getting an incoming light ray modulated by the liquid crystal layer and then reflected by the reflective layer. In some reflective liquid crystal display devices, the pixel electrodes thereof also function as the reflective layer. The pixel electrodes with such a reflection function (which are sometimes called "reflective pixel electrodes") may be obtained by using a metal having a high reflectivity as a material for the pixel electrodes. Those reflective pixel electrodes may have their surface patterned into any of various shapes so as to have either scattering (or diffusing) reflective properties (see Japanese Patent No. 3187369, for example) or retro-reflective properties (see Japanese Patent Application No. 2000-096075, for example).

In a transmissive liquid crystal display device on the other hand, the pixel electrodes thereof are normally transparent electrodes and often define a flat layer with a surface that is parallel to that of the liquid crystal layer. However, to improve the viewing angle characteristics of the liquid crystal display device by orienting the liquid crystal molecules in various directions, those transparent pixel electrodes may also have their surface shapes controlled in such a manner as to utilize either shape effects or inclined electric field effects.

In such a liquid crystal display device, the pixel electrodes with that controlled surface shape are provided over an active-matrix substrate. More specifically, an interlevel dielectric layer is formed on the active-matrix substrate so as to have a predetermined surface shape and then the pixel electrodes are formed on the interlevel dielectric layer. That is, the surface shape of the pixel electrodes is controlled by the surface shape of the interlevel dielectric layer on which the pixel electrodes are formed. Also, those pixel electrodes are electrically connected to active components by way of contact holes that are provided through the interlevel dielectric layer.

The conventional liquid crystal display devices, however, have the following drawbacks. Hereinafter, the problems of an active-matrix-addressed liquid crystal display device to be fabricated by a conventional method so as to have retro-reflective properties will be described with reference to FIGS. 11A through 11D.

First, as shown in FIG. 11A, a gate electrode 1102, a source electrode 1103, a drain electrode 1104 and a connector electrode 1105 are formed on a glass substrate 1101. In FIG. 11A, a semiconductor layer (including a channel region) which covers the gate electrode 1102 is not shown for the sake of simplicity. The substrate including these members thereon will be simply referred to herein as a "substrate 1107". The gate, source, drain electrodes 1102, 1103, 1104 and the semiconductor layer (including a channel region) together make up a TFT. Although not shown in FIGS. 11A through 11D, a gate-bus line and a source-bus line are respectively connected to the gate electrode 1102 and the source electrode 1103 of the TFT. The connector electrode 1105 is electrically connected to the drain electrode 1104 and will be connected to a pixel electrode 1110 through a contact hole 1109 to be described later. Optionally, the connector electrode 1105 may be omitted. In that case, the contact hole 1109 needs to be provided over the drain electrode 1104 such that the drain electrode 1104 will be directly connected to the pixel electrode 1110.

Next, as shown in FIG. 11B, an undercoat film 1108 for a retro-reflective layer is bonded onto the substrate 1107 by the method disclosed in U.S. Pat. No. 4,601,861, for example. The undercoat film 1108 is made of an insulator (typically a resin).

Subsequently, as shown in FIG. 11C, a contact hole 1109 is formed through the undercoat film 1108 by a photolithographic process, for example, so as to be located over the connector electrode 1105. That is to say, a portion of the connector electrode 1105 is exposed inside the contact hole 1109 that has been formed through the undercoat film 1108.

Thereafter, as shown in FIG. 11D, a pixel electrode 1110 is formed on the undercoat film 1108 so as to be connected to the connector electrode 1105 by way of the contact hole 1109. The pixel electrode 1110 may be formed by selectively depositing a metal material (e.g., Al) on the substrate by an evaporation process with unnecessary regions masked. Alternatively, a film of the metal material may be deposited over the entire surface of the substrate 1107 and then patterned into the predetermined shape by a photolithographic process, for example. The pixel electrode 1110 is a retro-reflective pixel electrode that also functions as a retro-reflective layer. In this manner, an active-matrix substrate is obtained.

Finally, the active-matrix substrate including the retro-reflective pixel electrode 1110 is bonded with a counter substrate (not shown), which has been prepared separately, with a predetermined gap provided between them. The counter substrate includes a color filter (CF) layer and a counter electrode, which are stacked in this order on a glass substrate, for example. The color filter layer includes red (R), green (G) and blue (B) color filters and optionally includes a black matrix. The counter electrode may be made of indium tin oxide (ITO), for example. Then, a scattering type liquid crystal material (e.g., a polymer dispersed liquid crystal material) is injected into the gap between the active-matrix and counter substrates, thereby obtaining a retro-reflective liquid crystal display device.

To achieve an ideal retro-reflection property, the surface shape of the retro-reflective layer needs to consist of two groups of planes that are tilted in mutually different directions with respect to the surface of the glass substrate 1101 (i.e., a plane that is parallel to the display screen) as schematically shown in FIGS. 12A and 12B. Also, these two groups of planes need to define a regular repetitive pattern. However, the pixel electrode 1110 formed by the conventional method includes a flat portion over the contact hole 1109 as shown in FIG. 11D. Thus, the cross-sectional shape of the retro-reflective pixel electrode 1110 is different from the rugged surface shape of the ideal retro-reflective layer.

Furthermore, in the regular rugged structure of the ideal retro-reflective layer, the depth L of the rugged structure (i.e., difference in vertical level between the highest-level points 1101 and the lowest-level points 1102) is obtained by multiplying the pitch P by $\sqrt{6}$ and dividing the product by 3 (i.e., L=SQRT (6)*P/3). Accordingly, to achieve the ideal retro-reflection property, the thickness of the undercoat film 1108 needs to be greater than the depth L of the rugged structure. That is to say, the depth of the contact hole 1109, which is used to electrically connect the connector electrode 1105 under the undercoat film 1108 to the retro-reflective pixel electrode 1110 on the undercoat film 1108, needs to be greater than the depth L of the rugged structure.

If the contact hole 1109 has a depth of about 1 µm or more, then it is normally difficult to cover the entire inner surfaces of the contact hole 1109 with the metal material of the pixel electrode 1110 by a thin-film deposition process. For that reason, to achieve good electrical connection by filling the contact hole 1109 with the metal material, the inner surfaces of the contact hole 1109 may be tapered. In that case, however, the diagonal size of the contact hole 1109 (i.e., its area when the contact hole 1109 is projected onto the surface of the substrate 1101) will increase. As a result, the portion of the pixel electrode 1110 over the contact hole 1109, which has a different surface shape from the other portions thereof, will increase its area.

Hereinafter, the problems of the retro-reflective pixel electrode 1110 made by the conventional method will be described in further detail with reference to FIGS. 13A and 13B.

The retro-reflective pixel electrode 1110a shown in FIG. 13A is connected to the connector electrode 1105 inside the contact hole 1109 that runs through the interlevel dielectric layer 1108a. Accordingly, the surface shape of that portion of the retro-reflective pixel electrode 1110a, which is located inside and around the contact hole 1109 (and will be referred to herein as a "contact hole portion"), is greatly different from the predetermined shape 1110aR of the retro-reflective pixel electrode 1110a. A portion of the pixel electrode that is electrically connected to the connector electrode (or drain electrode) will be referred to herein as a "contact portion". If the contact portion is located inside a contact hole, a portion of the pixel electrode, which covers the contact hole and has a different surface shape from that of the other portions thereof, will be referred to herein as a "contact hole portion".

The distribution of the tilt angles Φ that are defined by the surface of the retro-reflective pixel electrode 1110a with the display screen (i.e., the surface of the glass substrate) is schematically shown in the lower portion of FIG. 13A. As shown in FIG. 13A, the tilt angle Φ steeply changes near the contact hole 1109 and significantly deviates from the ideal tilt angle ΦR of the retro-reflective pixel electrode 1110a. Also, a flat portion with a tilt angle Φ of zero degrees is present at the center of the contact hole 1109.

As described above, if the pixel electrode 1110a is electrically connected to the connector electrode 1105 inside the contact hole 1109, then the surface shape of the pixel electrode 1110a will be greatly different from the predetermined shape there. Thus, the intended retro-reflection property is not achievable. As a result, the effective display area virtually decreases, the contrast ratio drops, and the display quality degrades eventually.

On the other hand, as shown in FIG. 13B, if a contact hole 1109, smaller than the contact hole 1109 shown in FIG. 13A, is provided through a portion of the interlevel dielectric layer 1108b that includes a lowest-level point 1102 of the retro-reflective pixel electrode 1110b (see FIG. 12A), then the flat portion with the tilt angle Φ of zero degrees will have a decreased area. However, the tilt angle changes even more steeply near the contact hole 1109 and the intended retro-reflection property is not achievable, either.

Such a phenomenon occurs in not just reflective display devices including a retro-reflective layer but also reflective display devices including a scattering reflective layer.

For example, in the reflective display device disclosed in Japanese Patent No. 3187369, the rugged surface shape of a scattering reflective layer is defined by the tilt angles that are formed by the surface with respect to the display screen. However, even if the surface shape of the scattering reflective layer is optimized, the scattering reflective layer also has a surface shape greatly different from the predetermined one in that contact hole portion as long as the reflective display device is manufactured by the conventional method. Thus, the intended scattering reflection property is not achievable, either.

As schematically shown in FIG. 14A, the portion of a scattering reflective electrode 1110c, which is located inside the contact hole 1109, has an almost entirely flat (i.e., Φ=0) surface shape. Accordingly, the tilt angle Φ also changes steeply, and the surface shape is also greatly different from the predetermined surface shape 1110cR representing the ideal scattering reflection property, near the contact hole 1109. As a result, the intended scattering reflection property is not achievable, either.

A similar problem may also occur in transmissive liquid crystal display devices, not just the reflective liquid crystal display devices described above. For example, to increase the aperture ratio of a transmissive liquid crystal display device, a transparent pixel electrode 1110d may be provided on a transparent interlevel dielectric layer 1108d as shown in FIG. 14B. In such a configuration, if the inner surfaces of the contact hole 1109 are tapered (where Φ≦45 degrees) to electrically connect the pixel electrode 1110d to the connector electrode 1105 just as intended, then the tilt angle Φ also changes near the contact hole 1109. In that case, the orientation directions of liquid crystal molecules also change near the contact hole 1109, thus possibly degrading the display quality.

Furthermore, even in a transmissive liquid crystal display device, the surface of the pixel electrode may also have to be roughened to control the orientation directions of the liquid crystal molecules. In that case, if the surface shape of the pixel electrode is not the predetermined one near the contact hole, the display quality might also degrade.

The problems described above may arise not only in the active-matrix-addressed liquid crystal display devices but also in simple-matrix-addressed liquid crystal display devices as well. Furthermore, similar problems may also happen in any other display device with a display medium layer exhibiting electro-optical effects, not just those liquid crystal display devices.

SUMMARY OF THE INVENTION

In order to overcome the problems described above, a primary object of the present invention is to improve the display quality of a display device in which an electrode and a circuit element are electrically connected together by way of an interconnecting member, which is formed in an interlevel dielectric layer provided between the electrode and the circuit element.

Another object of the present invention is to provide a method for fabricating such a display device efficiently enough.

A display device according to a preferred embodiment of the present invention preferably includes a substrate, a circuit element, an interlayer film, and an electrode. The circuit element is preferably provided on the substrate. The interlayer film is preferably provided over the circuit element and preferably includes an interlevel dielectric layer and an interconnecting member that runs through the interlevel dielectric layer. The electrode is preferably provided on the interlayer film. The electrode and the circuit element are preferably electrically connected together by way of the interconnecting member. The electrode on the interlayer film preferably has a substantially uniform surface shape. As used herein, the "circuit elements" include not only circuit components such as active components (e.g., TFTs and MIMs) and passive components (e.g., resistors and capacitors) but also interconnections and electrodes as well.

In one preferred embodiment of the present invention, the electrode preferably has the function of reflecting light, and the electrode on the interlayer film preferably exhibits a substantially uniform reflection property.

In this particular preferred embodiment, the electrode may have a retro-reflection property.

In an alternative preferred embodiment, the electrode may have a scattering reflection property.

In another preferred embodiment, the interconnecting member is preferably made of a material that has a smaller thermal expansion coefficient than that of the interlevel dielectric layer.

In still another preferred embodiment, the interconnecting member and the interlevel dielectric layer are preferably each made of a material including a resin.

Specifically, the resin is preferably a thermosetting resin or a photo-curable resin.

More particularly, when cured, the resin included in the material of the interconnecting member preferably shrinks less than the resin included in the material of the interlevel dielectric layer.

In yet another preferred embodiment, the electrode may be a pixel electrode. In that case, the display device preferably further includes a counter electrode, which faces the pixel electrode, and a liquid crystal layer, which is provided between the pixel electrode and the counter electrode.

Another preferred embodiment of the present invention provides a method for fabricating a display device that includes: a substrate; a circuit element on the substrate; an interlayer film, which is provided over the circuit element and which includes an interlevel dielectric layer and an interconnecting member that runs through the interlevel dielectric layer; and an electrode on the interlayer film. In the display device, the electrode and the circuit element are preferably electrically connected together by way of the interconnecting member. The method preferably includes the steps of: (a) forming the interlayer film that includes the interlevel dielectric layer and the interconnecting member running through the interlevel dielectric layer; (b) changing the surface shape of a portion of the interlayer film, on which the electrode will be provided, into a predetermined shape after the step (a) has been performed; and (c) forming the electrode on the interlayer film.

In one preferred embodiment of the present invention, the step (b) preferably includes the step of changing the surface shape of the portion of the interlayer film into the predetermined shape that is substantially uniform over a region where the electrode will be provided.

In another preferred embodiment, the step (b) preferably includes the step of changing the surface shape of the portion of the interlayer film into a shape that imparts a retro-reflection property to the electrode.

In an alternative preferred embodiment, the step (b) may include the step of changing the surface shape of the portion of the interlayer film into a shape that imparts a scattering reflection property to the electrode.

In still another preferred embodiment, the steps (a) and (b) may be performed somewhere other than on the substrate on which the circuit element has been provided. In that case, the method may further include the step of transferring the interlayer film onto the substrate, on which the circuit element has been provided, after the steps (a) and (b) have been performed.

Alternatively, the steps (a), (b) and (c) may also be performed on the substrate on which the circuit element has been provided.

In yet another preferred embodiment, the step (a) may include the steps of forming the interlevel dielectric layer that has an opening, and filling the opening with a conductive material to obtain the interconnecting member. Specifically, if the circuit element includes a conductive layer, the step of filling the opening with the conductive material may include the step of utilizing an electric field that has been generated from the conductive layer. Exemplary methods of utilizing the electric field include electrolytic polymerization, electrodeposition (or electroplating) and electrodeposition analysis. Alternatively, the step of filling the opening with the conductive material may include the step of performing an inkjet process.

In yet another preferred embodiment, the step (a) may include the steps of forming the interconnecting member of a conductive material and forming the interlevel dielectric layer such that the interconnecting member is surrounded by the interlevel dielectric layer. In this particular preferred embodiment, the step of forming the interconnecting member may include the step of forming the interconnecting member by a photolithographic process. Alternatively, the step of forming the interconnecting member may include the step of forming the interconnecting member with a dispenser.

In yet another preferred embodiment, the step (a) may include the step of forming the interlevel dielectric layer and the interconnecting member of materials that each include a resin.

In this particular preferred embodiment, the step (b) preferably includes the step of heating the interlayer film. More specifically, the step (a) preferably includes the step of forming the interconnecting member of a material that has a smaller thermal expansion coefficient than that of the interlevel dielectric layer.

In a specific preferred embodiment, the resin may be a thermosetting resin or a photo-curable resin. In that case, when cured, the resin included in the material of the interconnecting member preferably shrinks less than the resin included in the material of the interlevel dielectric layer.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 1A and 1B schematically illustrate two exemplary reflective pixel electrode structures in reflective liquid crystal display devices according to preferred embodiments of the present invention, wherein:

FIG. 1A schematically illustrates the structure of a retro-reflective pixel electrode; and FIG. 1B schematically illustrates the structure of a scattering reflective pixel electrode.

FIG. 15A schematically shows a cross-sectional structure including contact hole portions 1502 with contact portions 1501 that were made by a conventional method.

FIG. 15B schematically shows a cross-sectional structure including no contact hole portions 1502 (or an ideal cross-sectional structure).

DETAILED DESCRIPTION OF PREFERRED EMBODIMENTS

Hereinafter, a display device and a method for fabricating the display device according to preferred embodiments of the present invention will be described with reference to the accompanying drawings. In the following preferred embodiments, the present invention will be described as being applied to a reflective liquid crystal display device. It should be noted, however, that the present invention is in no way limited to those illustrative preferred embodiments.

Figure 1A:
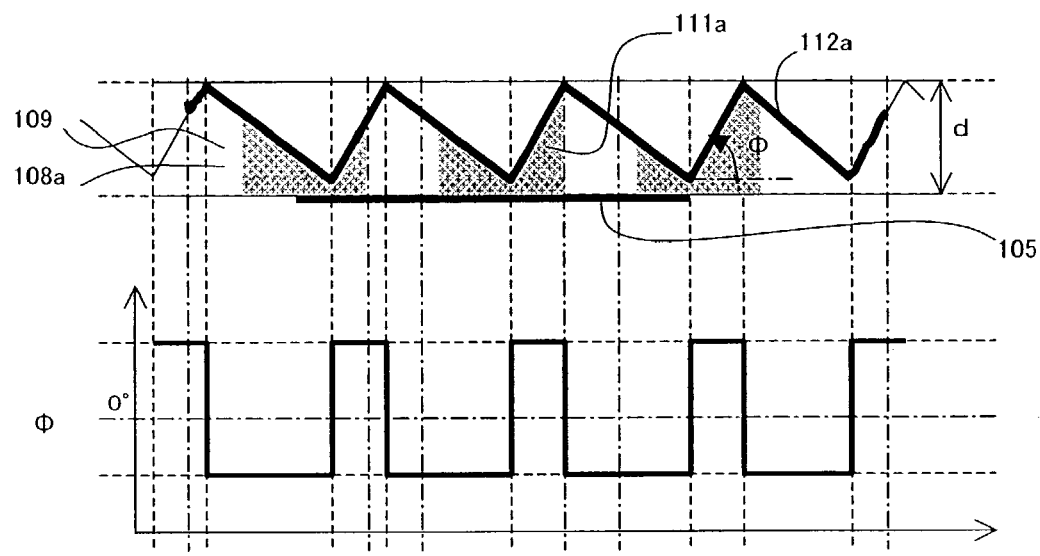
Figure 1B:
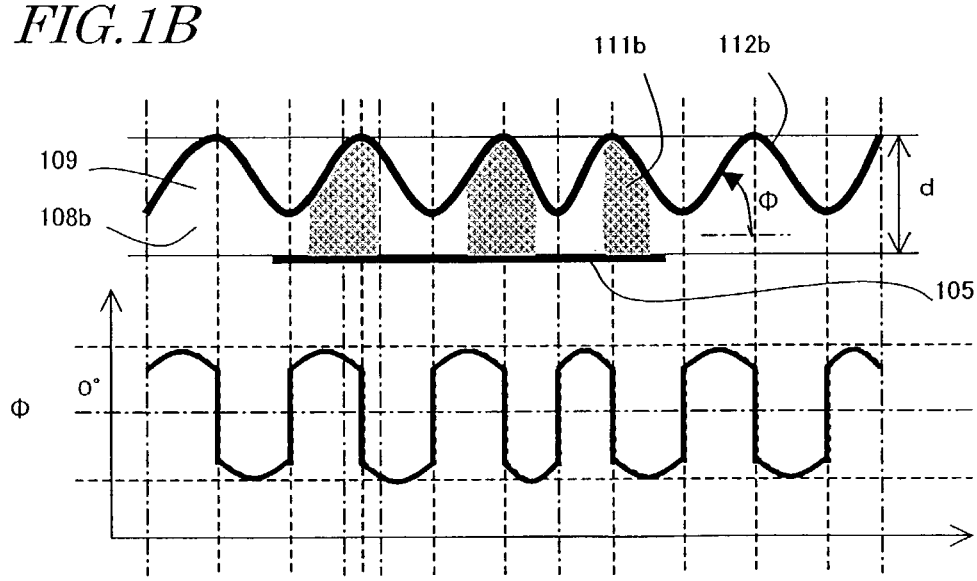

First, the structure of a reflective pixel electrode in a reflective liquid crystal display device according to a specific preferred embodiment of the present invention will be described with reference to FIGS. 1A and 1B. FIG. 1A schematically illustrates the structure of a retro-reflective pixel electrode, while FIG. 1B schematically illustrates the structure of a scattering reflective pixel electrode.

In the following description, if any member of the reflective liquid crystal display device has substantially the same function as the counterpart of the active-matrix substrate to be made by the conventional method shown in FIGS. 11A through 11D, the member will be herein called by the same name and the description thereof will be omitted herein.

As shown in FIG. 1A, the retro-reflective pixel electrode 112a of this preferred embodiment has a substantially uniform, predetermined surface shape and exhibits a substantially uniform retro-reflection property. Specifically, the interlayer film 109, which is used as an undercoat film for the reflective pixel electrode 112a, includes interconnecting members 111a to electrically connect the reflective pixel electrode 112a to the connector electrode 105 and an interlevel dielectric layer 108a. The surface shape of the interlayer film 109 is substantially uniform. That is to say, the surface of the interconnecting members 111a is substantially continuous with that of the interlevel dielectric layer 108a, thereby defining the predetermined surface shape.

The lower portion of FIG. 1A shows the distribution of the tilt angles Φ that are defined by the surface of the reflective pixel electrode 112a with the display screen (or the surface of the glass substrate). As can be seen from FIG. 1A, two groups of planes having mutually different tilt angles Φ are regularly arranged on the surface of the reflective pixel electrode 112a. That is to say, the pixel electrode 112a maintains the predetermined surface shape both on the interlevel dielectric layer 108a and on the interconnecting members 111a alike.

As shown in FIG. 1B, the scattering reflective pixel electrode 112b of this preferred embodiment also has a substantially uniform, predetermined surface shape and exhibits a substantially uniform scattering reflection property. Specifically, the interlayer film 109, which is used as an undercoat film for the reflective pixel electrode 112b, includes interconnecting members 111b to electrically connect the reflective pixel electrode 112b to the connector electrode 105 and an interlevel dielectric layer 108b. The surface shape of the interlayer film 109 is substantially uniform. That is to say, the surface of the interconnecting members 111b is substantially continuous with that of the interlevel dielectric layer 108b, thereby defining the predetermined surface shape.

The lower portion of FIG. 1B shows the distribution of the tilt angles Φ that are defined by the surface of the reflective pixel electrode 112b with the display screen. As can be seen from FIG. 1B, the tilt angle Φ changes in a regular pattern. That is to say, the pixel electrode 112b maintains the predetermined surface shape both on the interlevel dielectric layer 108b and on the interconnecting members 111b alike. Thus, the tilt angle Φ changes regularly and periodically.

The surface shape of the reflective pixel electrode 112b having a scattering reflection property is not limited to the example illustrated in FIG. 1B but may be any of various other shapes. In particular, if the concavo-convex pattern repeats itself in regular periods, the display quality might deteriorate due to the interference of light. For that reason, it is rather preferable to get the concavo-convex pattern repeated in irregular periods. In this preferred embodiment, the concavo-convex pattern can be repeated in irregular periods over the entire surface of the reflective pixel electrode 112b. In the reflective pixel electrode made by the conventional method, the surface shape thereof is deformed periodically because of the presence of contact holes, and therefore, the display quality sometimes deteriorates due to the interference of light to be caused by such a periodical deformation. In contrast, the preferred embodiment of the present invention provides a reflective pixel electrode exhibiting a good scattering reflection property with the interference of light minimized.

When the retro-reflective pixel electrode 112a or scattering reflective pixel electrode 112b has the "substantially uniform surface shape", the reflective pixel electrode 112a or 112b herein should exhibit substantially the same retro-reflection or scattering reflection property both on the interconnecting members and on the interlevel dielectric layer alike. Thus, in that situation, the difference in retro-reflection or scattering reflection property between the interconnecting members and the interlevel dielectric layer should be too small to affect the eventual display quality significantly. Hereinafter, it will be described how to estimate the degree of deformation of the surface shape of the interconnecting members in the reflective pixel electrode.

As already described with reference to FIGS. 13A, 13B, 14A and 14B, if the retro-reflective or scattering reflective pixel electrode is made by any of the conventional methods, the tilt angle Φc that is defined by the surface of the reflective pixel electrode with the display screen in the contact hole portion is quite different from the ideal tilt angle ΦR, which is almost equal to the tilt angles defined by the surfaces of the other portions thereof with the display screen. As the difference between the tilt angles Φc and ΦR increases, the gap between the actual optical property of the contact hole portion and the desired (or designed) optical property (i.e., expected reflection property) thereof broadens. Stated otherwise, as the difference between the tilt angles Φc and ΦR decreases, it becomes easier and easier to close the gap between the actual and ideal optical properties of the contact hole portion. Also, when there is just a slight difference between the tilt angles Φc and ΦR, the cross-sectional area of the contact hole portion should not be so much different from that of any other portion when the reflective pixel electrode is viewed vertically to the display screen.

Hereinafter, it will be described how to define a preferred surface shape for the contact hole portion based on the difference between the cross-sectional areas to achieve a more ideal optical property than that of the contact structure made by the conventional method. The difference in cross-sectional area between the contact hole portion and the other portion, which will determine the preferred surface shape for the contact hole portion, changes with the specific preferred shape of the reflective pixel electrode. Thus, two preferred differences in cross-sectional area will be described for two specific reflective pixel electrodes with mutually different surface shapes.

First, a preferred difference in cross-sectional area, which will determine the preferred surface shape of a pixel electrode with a flat surface, will be described.

Figure 14A:
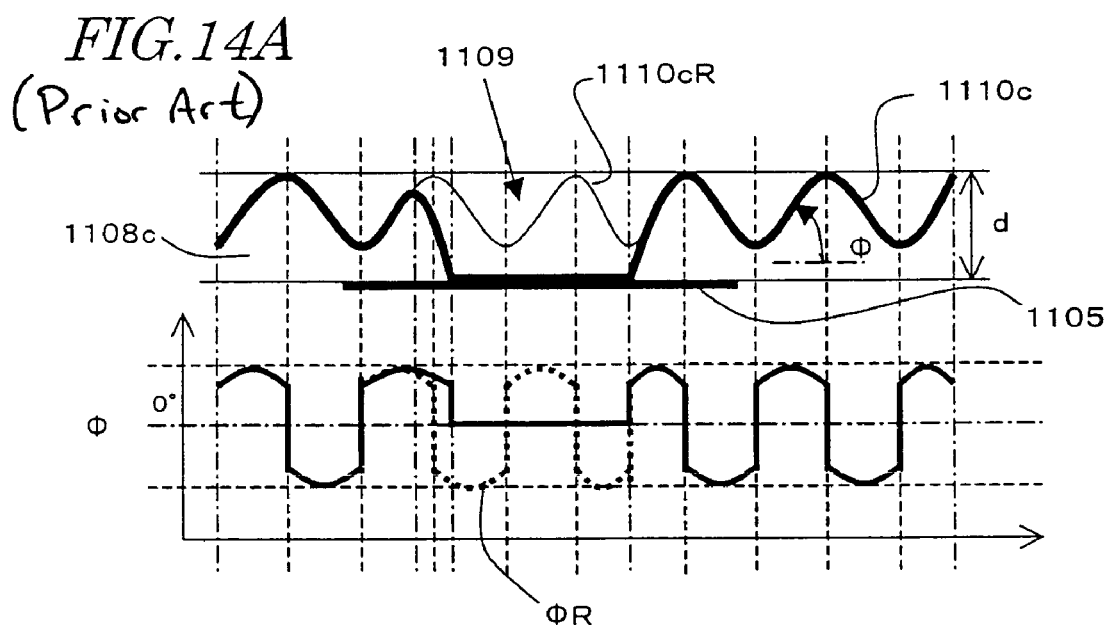
FIG. 14A shows the cross-sectional shape of a contact hole portion and surrounding portions of a scattering reflective electrode that was made by a conventional method and how the tilt angle defined by the surface of the scattering reflective electrode changes.
Figure 14B:
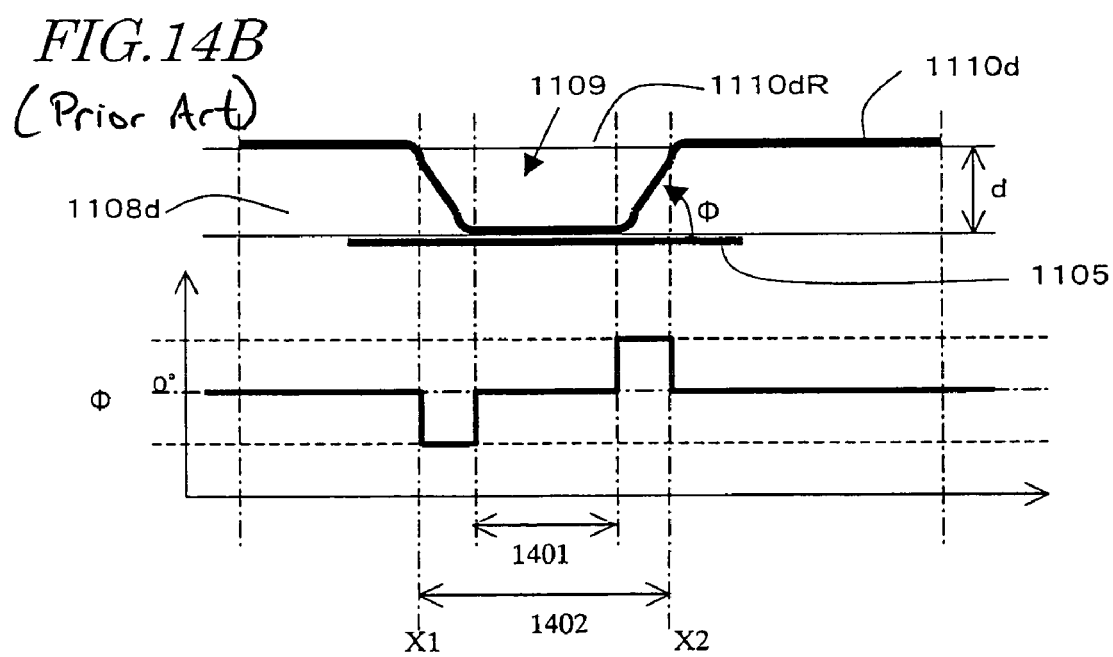
FIG. 14B shows the cross-sectional shape of a contact hole portion and surrounding portions of a transparent pixel electrode that was made by a conventional method and how the tilt angle defined by the surface of the transparent pixel electrode changes.

As shown in FIG. 14B, when the interlevel dielectric layer 1108d has the contact hole 1109, the tilt angle Φc defined by the surface of the pixel electrode 1110d in the contact hole portion 1402, including the contact portion 1401, is different from that of the other portions. That is to say, the surface shape of the contact hole portion 1402 is different from the ideal surface shape.

Suppose an x-y coordinate system is defined on the surface of the substrate to calculate the cross-sectional area of the contact hole portion 1402 by first and second sets of coordinates (x1, y1) and (x2, y1), where x1<x2. In the following example, the cross-sectional area of that portion of the interlevel dielectric layer 1108d is obtained as a close approximation to that of the contact hole portion 1402.

If the interlayer film (including the interlevel dielectric layer and the interconnecting members) has the ideal surface shape 1110dR, the portion of the interlayer film, which is defined by the first and second sets of coordinates, has an ideal cross-sectional area SR that is obtained as the product of (x2−x1) and the thickness d of the interlayer film 1108d as shown in FIG. 14B. It should be noted that the interlevel dielectric layer and the interlayer film are both identified by the same reference numeral 1108d in FIGS. 14A, 14B, 15A and 15B because the illustration of the interconnecting members is omitted from these drawings.

On the other hand, if the contact hole 1109 is formed, the cross-sectional area Sc of the contact hole portion 1402 is smaller than the ideal cross-sectional area SR at least by the product of the width and the thickness d of the contact portion 1401. That is to say, Sc<SR. Also, as shown in FIG. 14B, if the contact hole 1109 has a tapered side surface, the difference between Sc and SR further increases by the cross-sectional area of that portion including the side surface. That is to say, Sc is obtained by subtracting the product of the width and the thickness d of the contact portion 1401 and {(the width of the contact hole portion 1402−the width of the contact portion 1401)×thickness d}/2 from SR.

According to the conventional method, it is difficult to form a contact hole 1109 with a side surface that defines a tilt angle Φ of about 90 degrees with the display screen and form the pixel electrode 1110d without causing any disconnection. Thus, the cross-sectional area Sc of the contact hole portion 1402 that is made by the conventional method is less than a half of the ideal cross-sectional area SR (i.e., Sc<SR/2). That is to say, the difference between the ideal cross-sectional area SR and the actual cross-sectional area Sc of the contact hole portion 1402 is greater than a half of the ideal cross-sectional area SR (i.e., SR−Sc>SR/2). According to the present invention, a contact hole portion having an ideal cross-sectional area can be formed. However, if a contact hole portion having a cross-sectional area Sc that is smaller than the ideal cross-sectional area SR by no greater than SR/2 is obtained (i.e., SR−Sc≦SR/2), the display quality of the display device should be better than the conventional one. To achieve the effects of the present invention sufficiently, the cross-sectional area Sc of the contact hole portion is preferably smaller than the ideal cross-sectional area SR by no greater than SR/4 (i.e., SR−Sc≦SR/4).

Figure 13A:
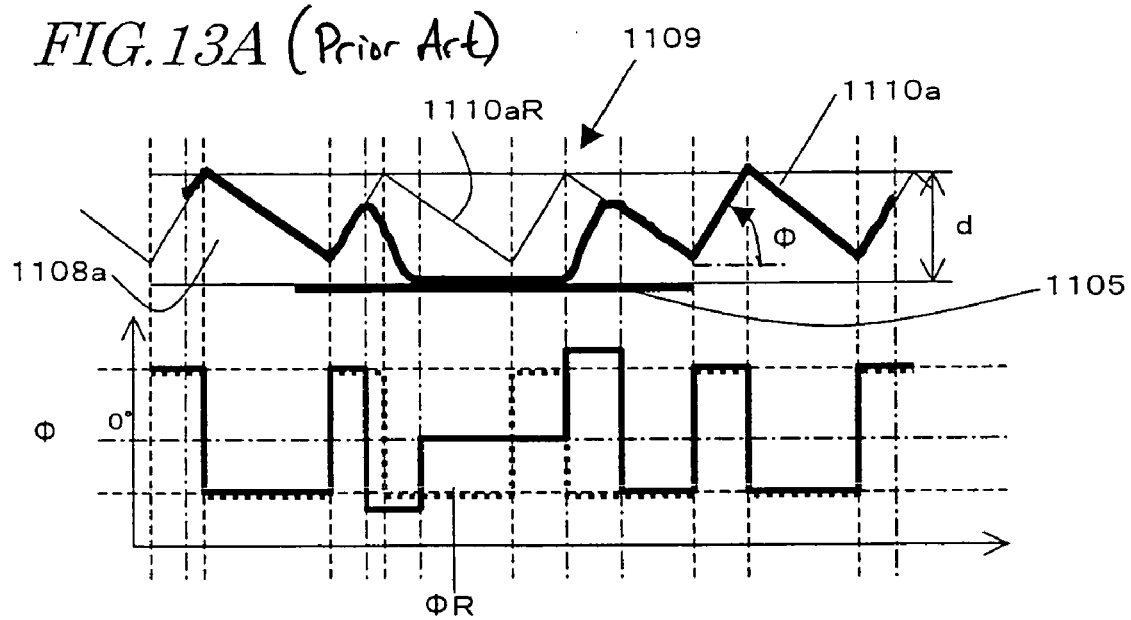
FIGS. 13A and 13B each show the cross-sectional shape of a contact hole portion and surrounding portions of a retro-reflective electrode that was made by a conventional method and how the tilt angle defined by the surface of the retro-reflective electrode changes.
Figure 13B:
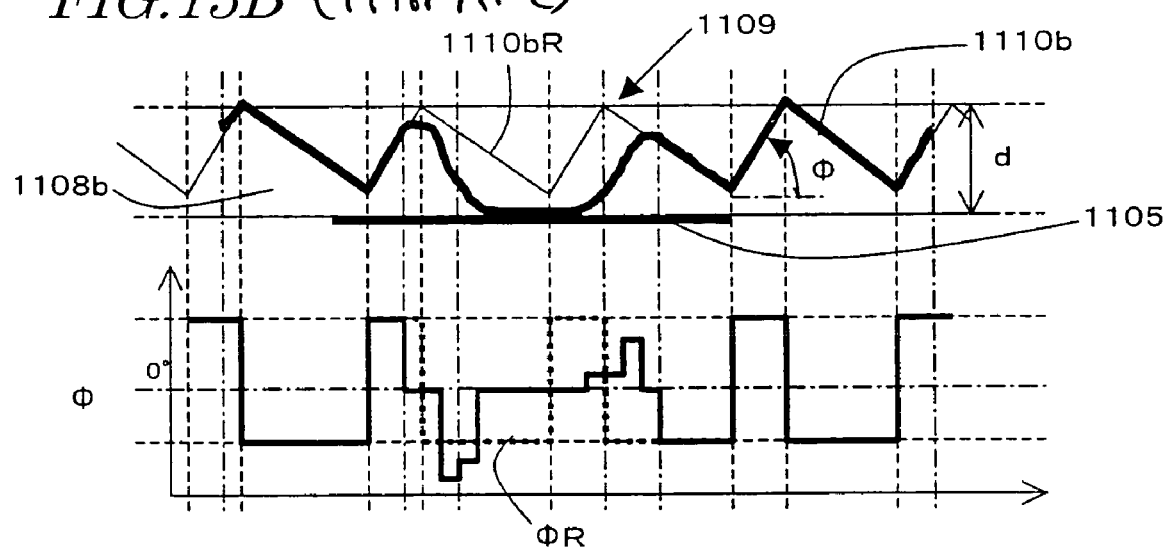

Next, it will be described with reference to FIGS. 15A and 15B what conditions the cross-sectional area of a pixel electrode with a concavo-convex surface shape such as that shown in FIG. 13A, 13B or 14A should satisfy to define the preferred surface shape.

FIG. 15A schematically illustrates a cross-sectional structure including contact hole portions 1502 with contact portions 1501 that were made by a conventional method. FIG. 15B schematically illustrates a cross-sectional structure including no contact hole portions 1502 (or an ideal cross-sectional structure). In FIGS. 15A and 15B, the thickness D (x, y) of the interlevel dielectric layer (or interlayer film) 1508 is represented as the sum of the changing thickness L (x, y) of the uneven portion and the constant thickness δ of the flat base portion (i.e., D (x, y)=L (x, y)+δ).

If the contact hole 1509 is formed, then the cross-sectional area Sc of the contact hole portion 1502 (i.e., an area obtained by finding an integral of D (x, y) in the range of x1 to x2) is smaller than the ideal cross-sectional area SR at least by the area of that portion of the interlayer film 1508 that has the thickness δ on the contact portion 1501 (i.e., the product of the width of the contact portion 1501 and δ). That is to say, for the same reasons as those described above, the difference (SR−Sc) can be no smaller than the product of the width of the contact portion 1501 and δ according to the conventional method. According to the present invention, a contact hole portion having an ideal cross-sectional area can be formed. However, if a contact hole portion, having a cross-sectional area Sc that is smaller than the ideal cross-sectional area SR by no greater than the product of the width of the contact portion 1501 and δ, is obtained, the display quality of the display device should be better than the conventional one. To achieve the effects of the present invention sufficiently, the cross-sectional area Sc of the contact hole portion is preferably smaller than the ideal cross-sectional area SR by no greater than (the width of the contact portion 1501×δ)/2.

In any of the two preferred embodiments described above, (SR−Sc) is preferably as small as possible and the contact hole portion ideally satisfies (SR−Sc)=0. However, a certain deviation should be allowed in view of mass productivity and display quality.

Hereinafter, a method for fabricating a display device according to this preferred embodiment will be described. A display device having the electrode structure described above can be fabricated efficiently by the following method.

In the conventional manufacturing process that has already been described with reference to FIGS. 11A through 11D, after the undercoat film 1108 having a predetermined surface shape has been formed, the contact hole 1109 is formed through the undercoat film 1108 and then the connector electrode 1105, which is exposed inside the contact hole 1109, is connected to the reflective electrode 1110. On the other hand, a method for fabricating a display device according to a preferred embodiment of the present invention includes the steps of: (a) forming an interlayer film that includes an interlevel dielectric layer and an interconnecting member that runs through the interlevel dielectric layer; (b) changing the surface shape of at least a portion of the interlayer film, on which a reflective electrode will be provided, into a predetermined shape; and then (c) forming the reflective electrode on the interlayer film. That is to say, in the manufacturing process of the present invention, the interconnecting member forms an integral part of the undercoat film for the reflective layer, and the surface of the interconnecting member and the surface of the interlevel dielectric layer are patterned into the predetermined shape at the same time. Accordingly, the surface of the interlayer film and the surface of the reflective electrode to be formed thereon can both be substantially uniform.

A display device including a retro-reflective pixel electrode according to a preferred embodiment of the present invention may be fabricated by performing the processing steps shown in FIGS. 2A through 2D.

Figure 2A:
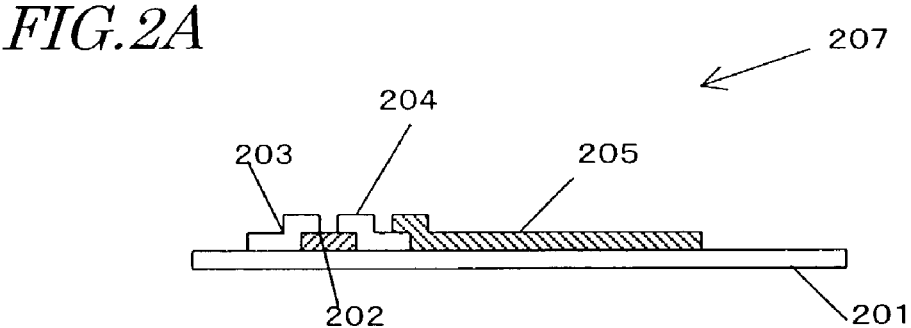
FIGS. 2A through 2D are cross-sectional views showing respective process steps for forming a retro-reflective pixel electrode in the manufacturing process of a display device according to a preferred embodiment of the present invention.

First, as shown in FIG. 2A, a gate electrode 202, a source electrode 203, a drain electrode 204 and a connector electrode 205 are formed on a glass substrate 201. In FIG. 2A, a semiconductor layer (including a channel region) which covers the gate electrode 202 is not shown for the sake of simplicity. The substrate including these members thereon will be referred to herein as a substrate 207.

Figure 2B:
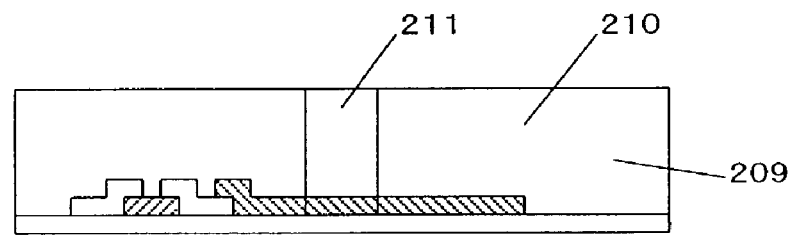

Next, as shown in FIG. 2B, an interlayer film 209, including an interlevel dielectric layer 210 and an interconnecting member 211 that runs through the interlevel dielectric layer 210, is provided over the substrate 207. Although just one interconnecting member 211 is illustrated in FIG. 2B, multiple interconnecting members 211 may be provided for a single connector electrode 205.

Figure 2C:
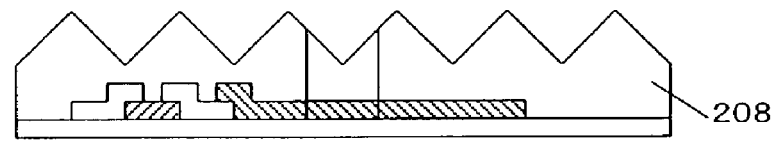

Subsequently, as shown in FIG. 2C, the surface of the interlayer film 209 is patterned into a predetermined shape to obtain an undercoat film 208 for a retro-reflective layer.

Figure 2D:
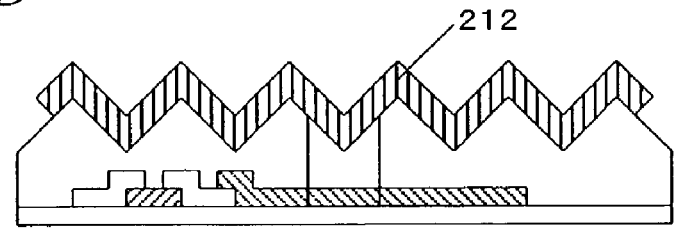

Thereafter, as shown in FIG. 2D, a reflective electrode 212 is formed on the undercoat film 208. The reflective electrode 212 may be formed by any of various known methods as already described for the prior art with reference to FIG. 11D.

It should be noted that the interlayer film 209 may be either deposited over the substrate 207 or transferred onto the substrate 207 after having been prepared somewhere else. It is also possible to pattern the interlayer film 209 into the predetermined shape and then transfer the patterned interlayer film 209 (i.e., the undercoat film 208) onto the substrate 207. That is to say, the undercoat film 208 including the interconnecting member 211 may be prepared somewhere else and then mounted on the substrate 207. The interconnecting members 211 are arranged at a pitch corresponding to a pixel pitch so as to be connected to their associated connector electrodes 205. Furthermore, the undercoat film 208 may also be transferred onto the substrate 207 even after the reflective electrode 212 or a reflective conductive film to be the reflective electrode 212 has been deposited on the undercoat film 208. On the other hand, if the reflective conductive layer is made of a material with some ductility, the reflective conductive layer (or the reflective electrode) may be formed on the interlayer film 209 and then have its surface patterned into the predetermined shape. Specific methods of forming the interlayer film 209 will be described in further detail later.

Hereinafter, it will be described with reference to FIGS. 3 through 8 how to make an active-matrix reflective substrate and a display device including such an active-matrix substrate.

First, an exemplary active-matrix-addressed liquid crystal display device will be described with reference to FIGS. 3 and 4.

Figure 3:
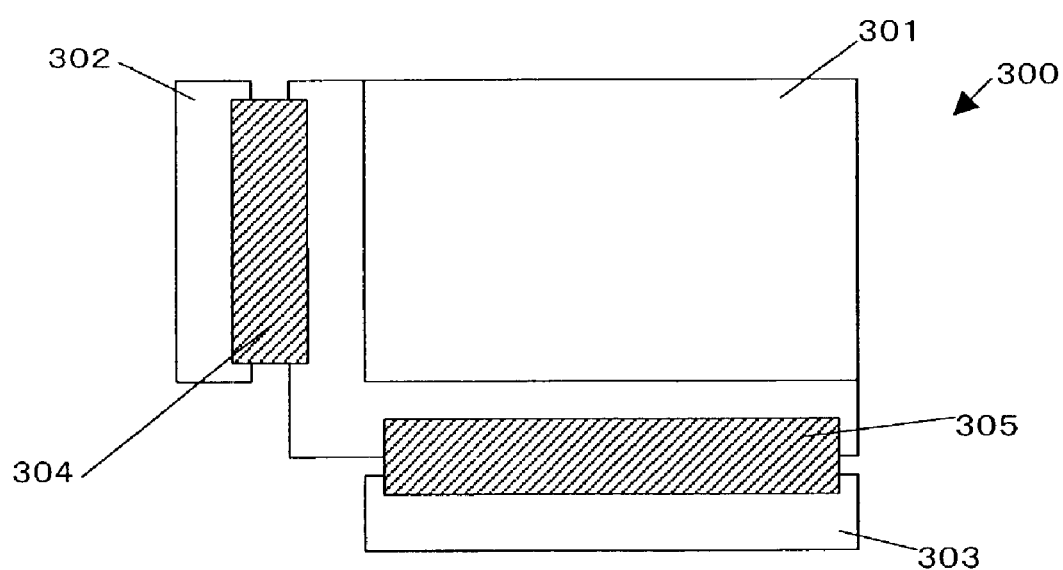
FIG. 3 is a plan view schematically illustrating a liquid crystal display device 300 according to a preferred embodiment of the present invention.

As shown in FIG. 3, the liquid crystal display device 300 includes an LCD panel 301, a gate driver circuit 302 for selectively driving a switching element in the LCD panel 301, a source driver circuit 303 for supplying a signal to each pixel electrode in the LCD panel 301, a gate driver 304 and a source driver 305.

Figure 4:
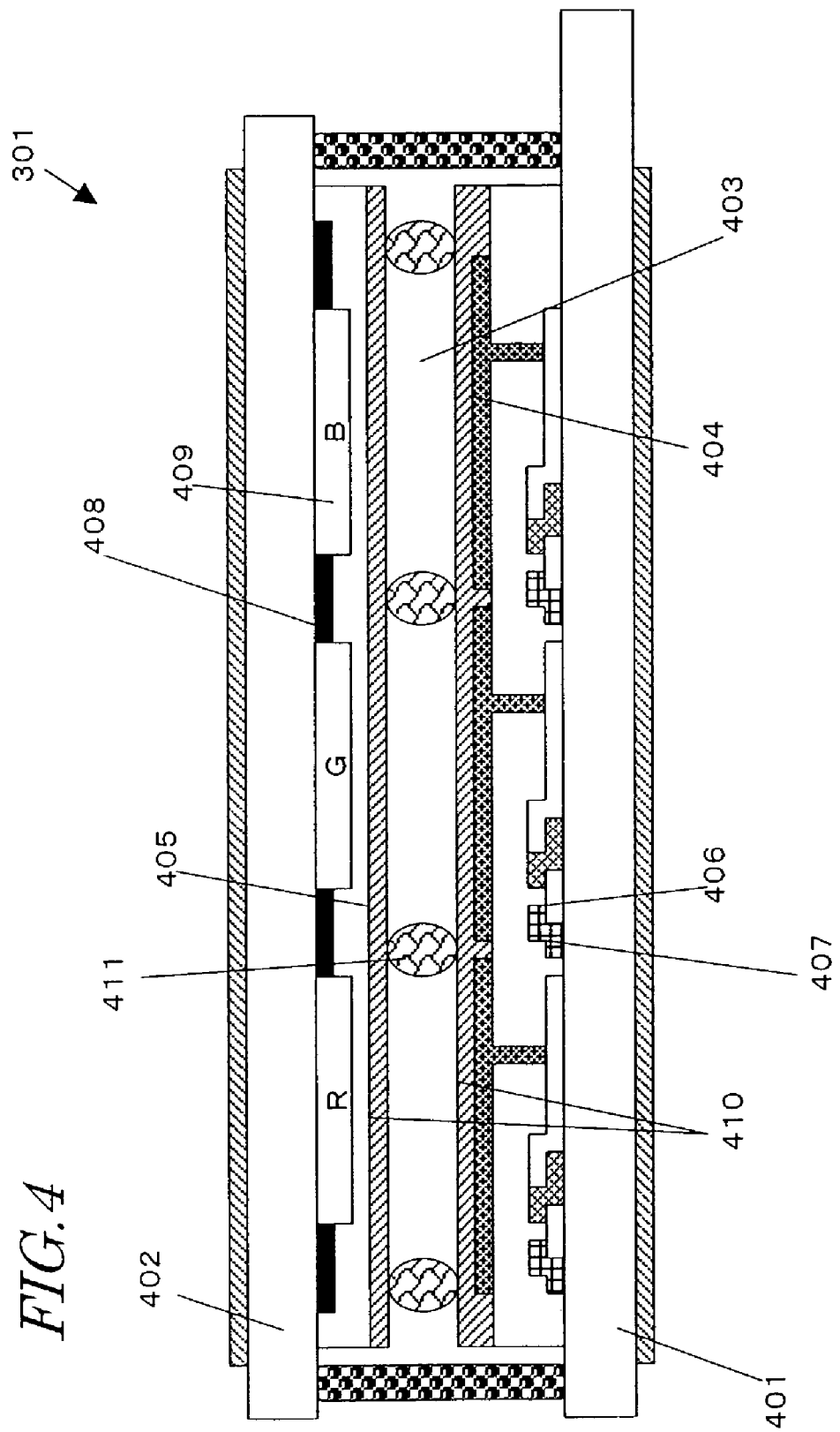
FIG. 4 is a cross-sectional view schematically illustrating the LCD panel 301 of the liquid crystal display device 300.

As shown in FIG. 4, the LCD panel 301 includes a pair of insulating substrates 401 and 402 and a liquid crystal layer 403 that is sandwiched between these substrates 401 and 402. The insulating substrate 401 is preferably a transparent substrate and typically a glass substrate.

Multiple pixel electrodes 404 are arranged in matrix on the substrate 401 so as to face the liquid crystal layer 403. A predetermined voltage is created between one of the pixel electrodes 404 and a common transparent electrode 405, which is provided on the inside surface of the other substrate (i.e., counter substrate) 402, and applied to a portion of the liquid crystal layer 403 corresponding to a predetermined pixel. In this manner, the liquid crystal display device can conduct a display operation by utilizing a variation in orientation direction of liquid crystal molecules. In the illustrated embodiment, the pixel electrodes 404 are reflective electrodes and actually have the predetermined surface shape. However, in FIG. 4, those pixel electrodes 404 are illustrated as having a flat surface for the sake of simplicity.

Each of the pixel electrodes 404 is connected to the source driver circuit 303 by way of its associated thin-film transistor (TFT) 406 and source-bus line 407 on the substrate 401. The ON/OFF states of each TFT 406 are controlled by selectively applying a voltage to the gate electrode thereof by way of a gate-bus line (not shown) on the substrate 401. The gate-bus line is connected to the gate driver circuit 302.

On the other hand, a black matrix 408, a color filter layer 409 including red (R), green (G) and blue (B) color filters, for example, and the common transparent electrode 405 are provided in this order on the counter substrate 402 so as to face the liquid crystal layer 403.

Furthermore, a pair of alignment layers 410, which has been subjected to some alignment treatment, is provided on the innermost surfaces of the substrates 401 and 402. A predetermined gap is maintained by spacers 411 between the substrates 401 and 402 to define the thickness of the liquid crystal layer 403.

Figure 5A:
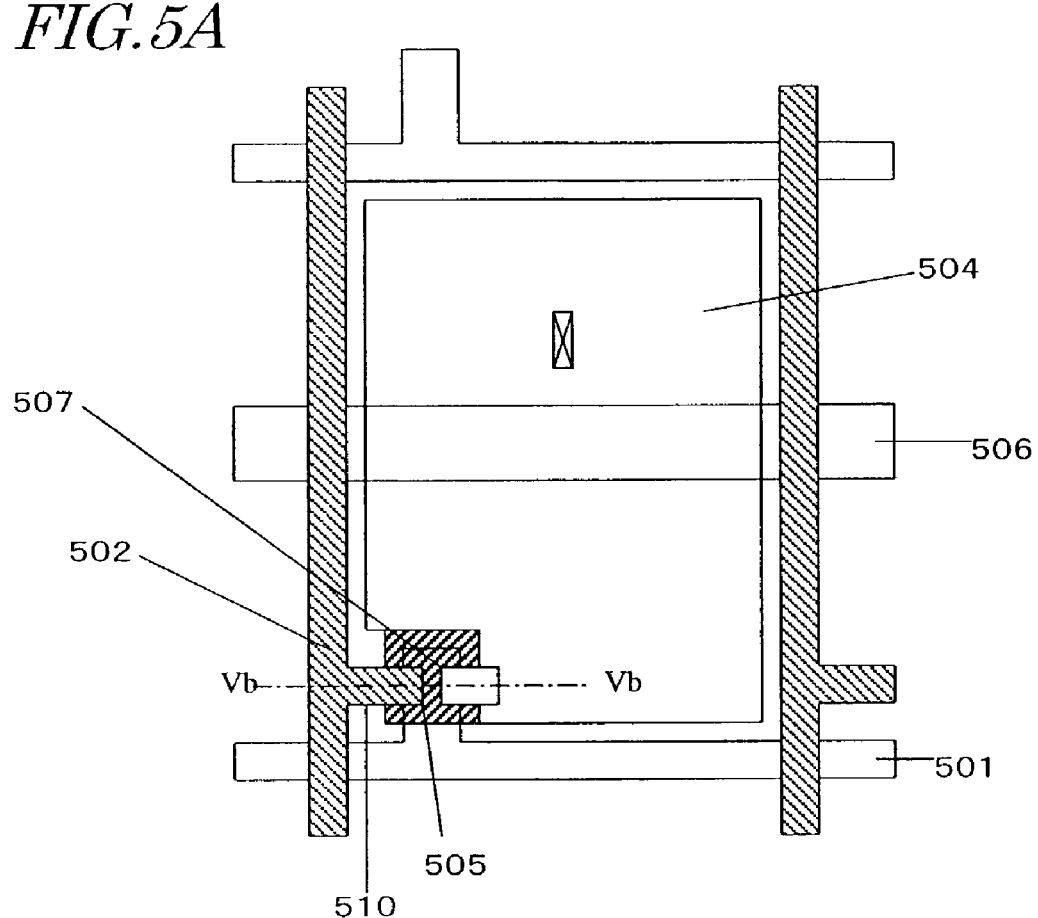
FIGS. 5A and 5B are respectively a plan view and a cross-sectional view schematically illustrating a pixel structure on the active-matrix substrate of the LCD panel 301.
Figure 5B:
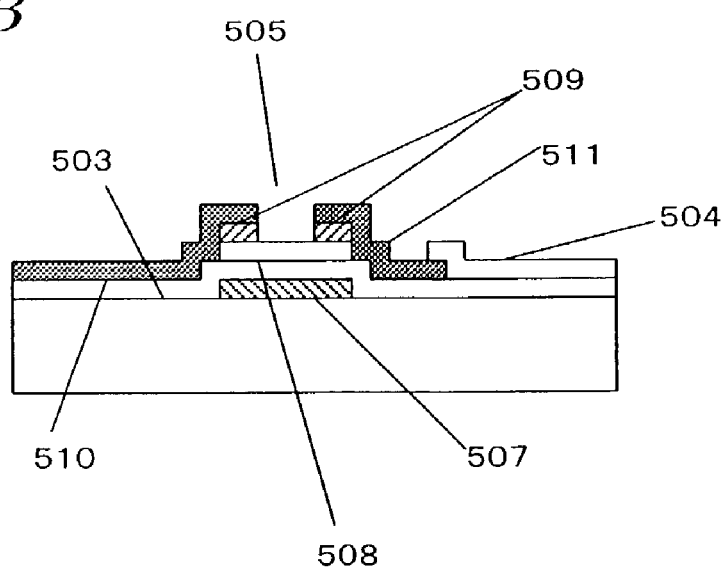

Next, an exemplary active-matrix substrate for use in the LCD panel 301 will be described with reference to FIGS. 5A and 5B. FIG. 5A illustrates a layout for a known unit pixel region. FIG. 5B is a cross-sectional view thereof taken on the plane Vb-Vb shown in FIG. 5A.

As shown in FIGS. 5A and 5B, multiple gate-bus lines 501 and multiple source-bus lines 502, crossing the gate-bus lines 501 substantially at right angles, are provided on a substrate of glass, for example. The gate-bus lines 501 and the source-bus lines 502 are located on mutually different layers with an insulating layer 503 interposed between them. A connector electrode 504 to be electrically connected to the pixel electrode (not shown) is formed of a transparent conductive film, for example, in an area that is surrounded with two gate-bus lines 501 and two source-bus lines 502. The connector electrode 504 receives a signal from the source-bus line 502 by way of the TFT 505 that is located near the intersection between the gate-bus line 501 and the source-bus line 502. A storage capacitor line 506 is provided under the connector electrode 504 so as to extend parallelly to the gate-bus lines 501 and create a storage capacitance between the pixel electrode and the storage capacitor line 506.

As shown in FIGS. 5A and 5B, the TFT 505 includes: a branch (i.e., a gate electrode 507) extending from the gate-bus line 501; a gate insulating film 503 covering the gate electrode 507; an intrinsic semiconductor layer 508, which overlaps with the gate electrode 507 with the gate insulating film 503 interposed between them; a doped semiconductor layer 509 on the intrinsic semiconductor layer 508; and a source electrode 510 and a drain electrode 511, which are respectively connected to the source and drain regions of the intrinsic semiconductor layer 508 by way of the doped semiconductor layer 509. The source electrode 510 is extended from, and integrated with, the source-bus line 502. The drain electrode 511 is a conductive member to electrically connect the drain region of the TFT 505 to the connector electrode 504. The drain electrode 511 may be formed along with the source-bus lines 502 and the source electrode 510 by patterning a metal film, for example. In this case, the drain electrode 511 and the connector electrode 504 do not have to be provided separately but may be combined together instead. That is to say, the source-bus line 502, source electrode 510, drain electrode 511 and connector electrode 504 may be formed by patterning the same film by a photolithographic process, for example.

The source electrode 510 and drain electrode 511 are connected together by way of the channel region of the intrinsic semiconductor layer 508. The conductivity of the channel region is controlled by the potential level at the gate electrode 507. If the TFT 505 is an n-channel transistor, the TFT 505 can be turned ON by increasing the potential level at the gate electrode 507 to the inversion threshold value of the transistor or more. In that situation, the source electrode 510 and the drain electrode 511 are electrically continuous with each other, and current flows between the source-bus line 502 and the connector electrode 504.

Hereinafter, it will be described with reference to FIG. 6 and FIGS. 7A through 7D how the retro-reflective pixel electrode may be formed. First, an example in which the interlayer film 209 shown in FIGS. 2B is used as a transferable film will be described.

Figure 6:
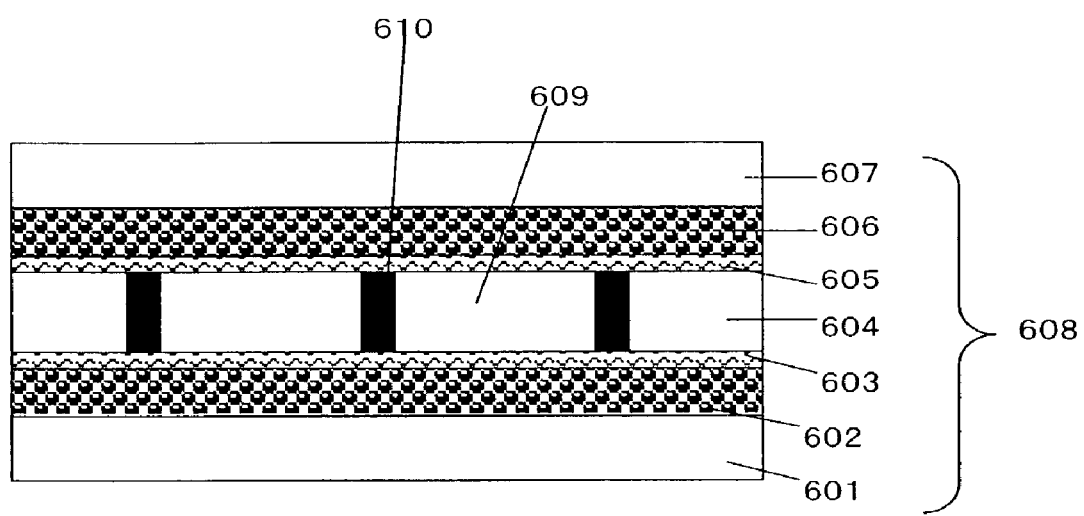
FIG. 6 is a cross-sectional view schematically illustrating a transferable undercoat film for use to fabricate a reflective liquid crystal display device according to a preferred embodiment of the present invention.

As shown in FIG. 6, a multilayer structure 608, including a buffer layer 602, a mold release layer 603, a layer 604 to be the undercoat film for the retro-reflective layer, another mold release layer 605, another buffer layer 606 and a protective layer 607 in this order on a base film 601, is prepared. The layer 604 to be the undercoat film for the retro-reflective layer (i.e., the interlayer film 209 shown in FIG. 2B) includes an interlevel dielectric layer 609 made of an insulator and interconnecting members 610 made of a conductor as described above. The interconnecting members 610 are regularly arranged and provided for the connector electrodes of respective pixels. The other layers of this multilayer structure 608 may be made of the same materials, and formed by the same methods, as any known transferable film.

By transferring this transferable multilayer structure 608, the interlayer film 209 shown in FIG. 2B can be obtained. Thereafter, if the surface of the interlayer film 209 is patterned into a predetermined shape by a stamping method to be described later, for example, the undercoat film 208 for the retro-reflective layer can be obtained.

Hereinafter, it will be described with reference to FIGS. 7A through 7D how to form the undercoat film 208 for the retro-reflective layer as a transferable film.

Figure 7A:
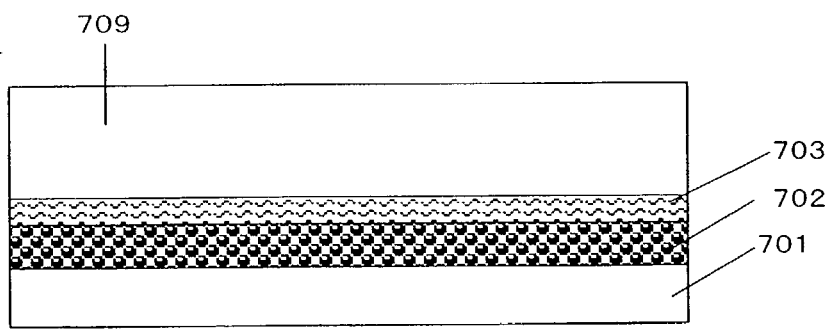
FIGS. 7A through 7D are cross-sectional views schematically showing respective process steps for preparing the transferable undercoat film for a retro-reflective layer for use to fabricate a reflective liquid crystal display device according to a preferred embodiment of the present invention.
Figure 7B:
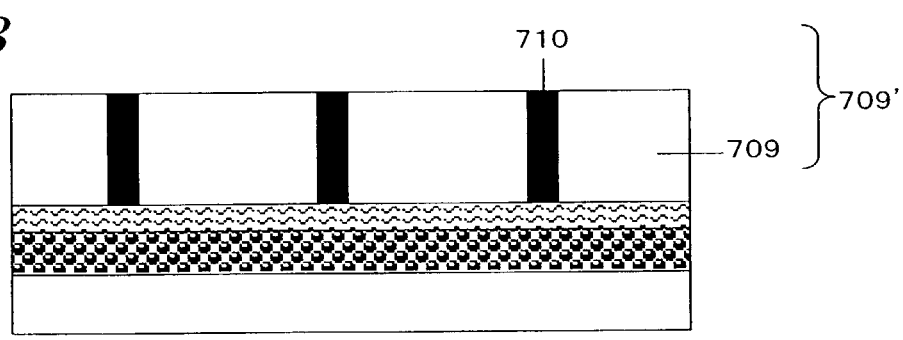

First, as shown in FIG. 7A, a buffer layer 702 and a mold release layer 703 are stacked in this order on a base film 701 and then an insulating layer 709 to be the interlevel dielectric layer 210 shown in FIG. 2B is deposited thereon. Next, portions of the insulating layer 709, in which conductive members (corresponding to the interconnecting members 211 shown in FIG. 2B) will be formed, are selectively removed by a photolithographic process, for example, and then the openings are filled with a conductive material, thereby forming the conductive members 710 as shown in FIG. 7B. It should be noted that the conductive members 710 do not have to be formed after the insulating layer 709 has been deposited. Alternatively, the conductive members 710 may be formed first, and then the insulating layer 709 may be deposited to surround the conductive members 710. One such method will be described later.

Figure 7C:
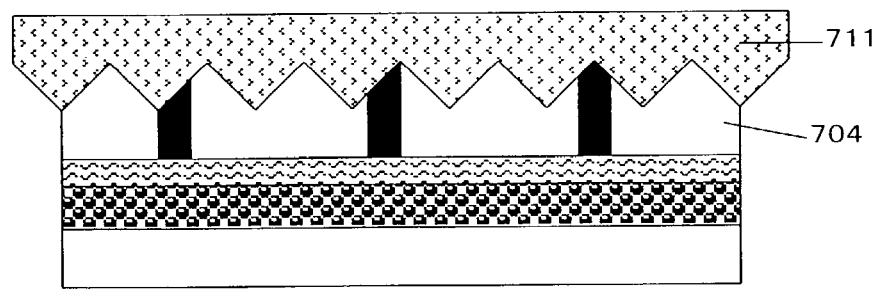

Subsequently, the interlayer film 709' (corresponding to the interlayer film 209 shown in FIG. 2B) to be the undercoat film for the retro-reflective layer has its surface patterned into a predetermined shape by using a retro-reflective pattern master 711, thereby forming the undercoat film 704 for the retro-reflective layer as shown in FIG. 7C. A surface shape realizing the retro-reflection function may be obtained in the following manner. For example, the interlayer film 709' may be made of either a thermosetting resin or a photo-curable resin. In that case, the interlayer film 709' of resin may be cured while being pressed against the master (or mold) 711.

Figure 7D:
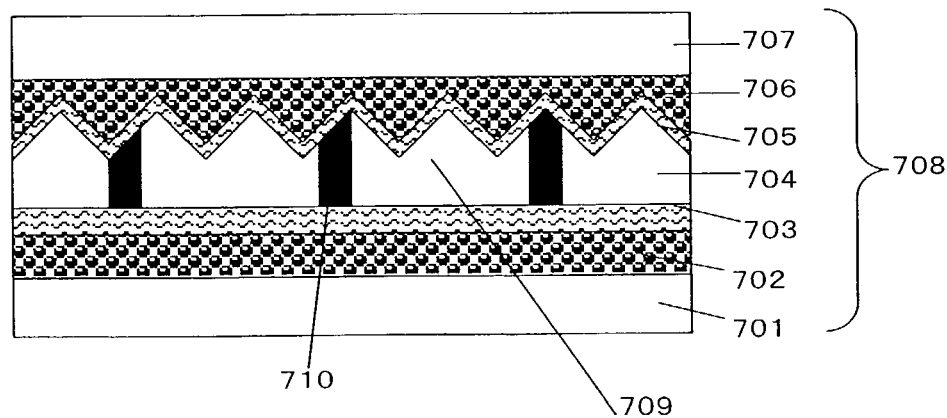

Thereafter, another mold release layer 705, another buffer layer 706 and a protective layer 707 are stacked in this order on the undercoat film 704 for the retro-reflective layer, thereby obtaining a multilayer structure 708, as shown in FIG. 7D, having transferable undercoat film 704 for the retro-reflective layer.

This undercoat film 704 for the retro-reflective layer is positioned with respect to the active-matrix substrate 207 such that the conductive members 710 (corresponding to the interconnecting members 211) are located over the connector electrodes 205 and then bonded onto the active-matrix substrate 207 as shown in FIG. 2C. By using this multilayer structure 708 that has been obtained in this manner, the drain electrode and pixel electrode of the active-matrix substrate 207 can be electrically connected together more easily and the retro-reflective surface can be used fully.

Figure 8:
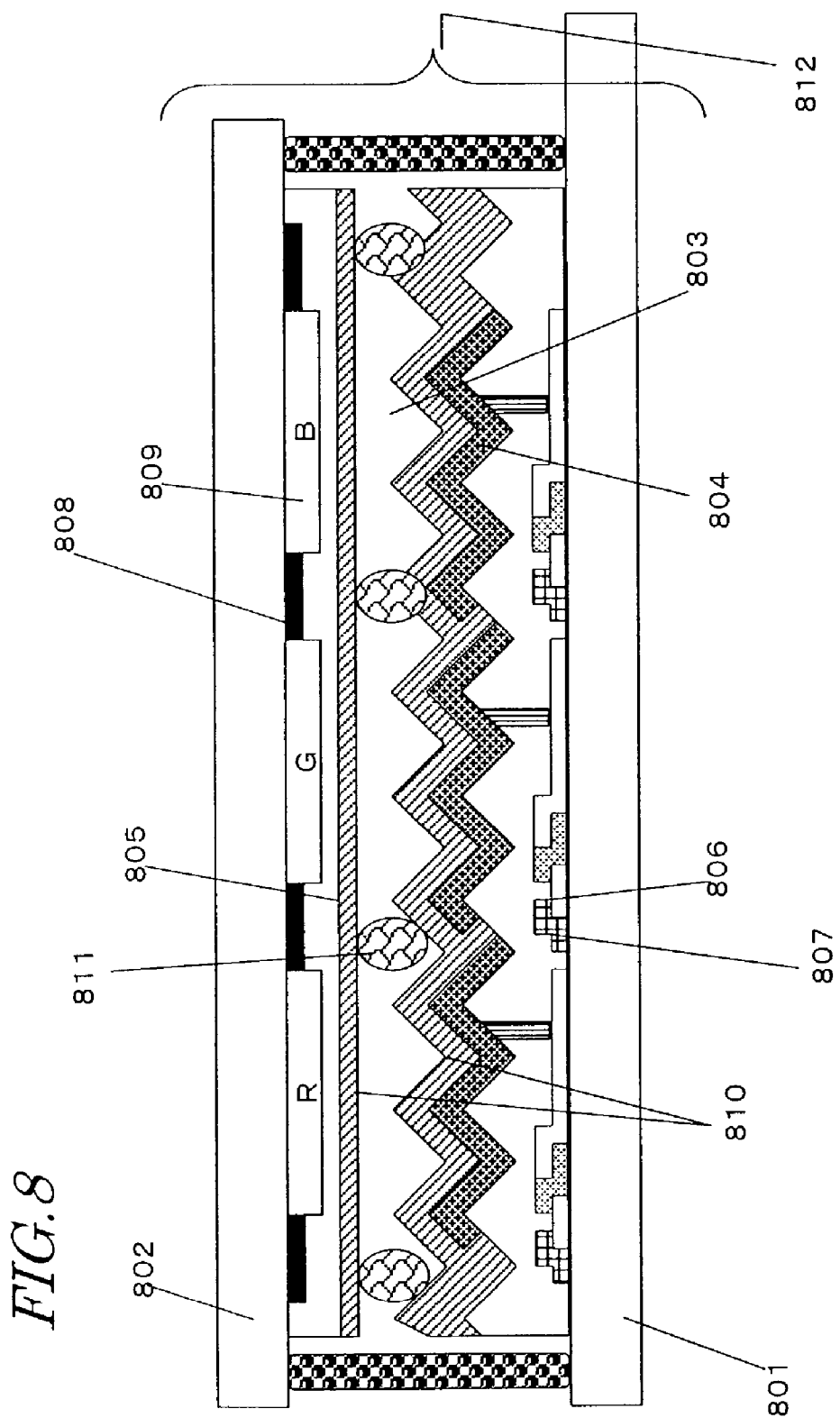
FIG. 8 is a cross-sectional view schematically illustrating an active-matrix-addressed retro-reflective LCD panel according to a preferred embodiment of the present invention.

An active-matrix-addressed retro-reflective panel 812 such as that shown in FIG. 8 may be formed by using the active-matrix substrate including such a retro-reflective electrode.

As shown in FIG. 8, the retro-reflective panel 812 includes a pair of insulating substrates 801 and 802 and a liquid crystal layer 803 sandwiched between these substrates 801 and 802.

Multiple retro-reflective pixel electrodes 804 are arranged in matrix on the substrate 801 so as to face the liquid crystal layer 803. A predetermined voltage is created between one of the pixel electrodes 804 and a common transparent electrode 805, which is provided on the inside surface of the other substrate (i.e., counter substrate) 802, and applied to a portion of the liquid crystal layer 803 corresponding to a predetermined pixel. Each of the retro-reflective pixel electrodes 804 is connected to its associated source-bus line 807 by way of its associated thin-film transistor (TFT) 806 on the substrate 801.

On the other hand, a black matrix 808, a color filter layer 809 including red (R), green (G) and blue (B) color filters, for example, and the common transparent electrode 805 are provided in this order on the counter substrate 802 so as to face the liquid crystal layer 803.

Furthermore, a pair of alignment layers 810, which has been subjected to some alignment treatment, is provided on the innermost surfaces of the substrates 801 and 802. A predetermined gap is maintained by spacers 811 between the substrates 801 and 802 to define the thickness of the liquid crystal layer 803.

The liquid crystal layer 803 preferably operates in a scattering liquid crystal display mode (e.g., a forward scattering liquid crystal display mode, in particular). More specifically, a mixture including a liquid crystalline monomer, a nematic liquid crystal material and a photo initiator may be injected into the gap between the substrates and then exposed to an ultraviolet ray, for example. Then, a forward scattering liquid crystal layer, which is transparent to incoming light while no voltage is applied thereto but which scatters the incoming light forward when a voltage is applied thereto, can be obtained.

An active-matrix-addressed retro-reflective panel 812 according to this preferred embodiment achieves a good retro-reflection property all over the reflective pixel electrodes 804 and therefore realizes the display of a bright and high-contrast image.

In the preferred embodiment described above, the reflective pixel electrodes have a retro-reflection property. Alternatively, the reflective pixel electrodes may also exhibit a scattering reflection property if the shape of the master 711 is changed.

Hereinafter, a method of forming the retro-reflective electrode (or the undercoat film for the retro-reflective layer) will be described in further detail.

First, a method in which the interconnecting members 211 are arranged at a pitch corresponding to the pixel pitch and then the interlevel dielectric layer 210 is formed to fill the gap between the interconnecting members 211 as shown in FIG. 2B will be described.

The conductive material of the interconnecting members may be a conductive resin. As used herein, the "conductive resin" may be a conductor-dispersed resin, which is obtained by dispersing a conductive material in an insulating resin, or an organic conductive compound in which a polymer itself exhibits electrical conductivity. Examples of insulating matrix resin materials for use in conductor-dispersed resins include acrylic resins, olefins, polyamides, polyimides, polyesters, phenol resins, epoxy resins and polyurethanes. Examples of conductive dispersants include fine particles of carbon (C), various conductive metals such as aluminum (Al), silver (Ag), copper (Cu), gold (Au) and zinc (Zn), and the alloys of these metals. Examples of organic conductive compounds include polyacetylene, polyaniline, polythiophene, and polypyrrole.

When a photo-curable resin such as an acrylic resin is used as a matrix resin, the resin may be patterned by a photolithographic process and the manufacturing process can be simplified. Alternatively, the resin may be patterned by a laser ablation or any other suitable method. In any case, multiple conductive members (i.e., interconnecting members) are made of a conductive resin material and arranged at a pitch corresponding to the pixel pitch. In this case, the conductive members are arranged such that at least one of the conductive members makes an electrical contact with each connector electrode. The thickness of the conductive members is at least equal to a value obtained by multiplying the pitch of the surface pattern of the retro-reflective electrodes to be made by $\sqrt{6}$ and then dividing the product by 3, i.e., the maximum depth of the surface pattern of the retro-reflective electrodes. The conductive members may also be formed at predetermined positions by using an applicator such as a dispenser instead of performing a photolithographic process.

If the conductive members are formed by a photolithographic process, then the later-explained stamping process step is carried out to pattern the surface of the conductive members into the retro-reflective shape by utilizing the thermosetting or thermoplastic property of the conductive members. On the other hand, if the conductive members are formed by any other method, the surface of the conductive members may be patterned by utilizing the thermosetting property and/or photo-curing property of the conductive members.

Next, the gap between these conductive members that have been formed to define a predetermined pattern in this manner is filled with an insulating resin. In this process step, the conductive resin and the insulating resin are not necessarily of the same type. However, to minimize the stress to be caused due to a thermal hysteresis in a subsequent process step and to increase the resistance to a process that uses a chemical agent, for example, the conductive and insulating resins are preferably of the same type.

If the retro-reflective surface shape is formed by subjecting the surface of the interlayer film to a stamping process step, the photo-curing property and/or the thermosetting property of the interlayer film is utilized to fix the shape. Thus, the resins of the interlayer film shrink when cured. In this case, if the property of the resin for the conductive members is significantly different from that of the resin for the interlevel dielectric layer, then the surface shape might be deformed at the boundary between the conductive member and the interlevel dielectric layer and the desired retro-reflection property might be unachievable. Also, if the conductive members cured shrink to a greater degree than the interlevel dielectric layer cured, then the surface of the conductive members will sink below the surface of the interlevel dielectric layer and the electrodes to be formed thereon may not be electrically connected with good stability. For that reason, the material of the conductive members preferably shrinks less than that of the interlevel dielectric layer when cured.

Also, when the stamped surface shape is fixed by utilizing the thermoplastic or thermosetting property of the resins, cooling conditions, in particular, cannot be defined too carefully. Even when the pair of resin materials has similar thermal expansion coefficients, the surface shape may still be deformed, and even cracked, due to the shrinkage thereof if the materials are cooled too rapidly. This is because resins have relatively large thermal expansion coefficients, generally speaking. For that reason, the resins are preferably cooled in as long a time as possible while still being pressed by the master. Also, the thermal expansion coefficients of the conductive resin material and insulating resin material to be used are preferably not so much different from each other (e.g., one of the two coefficients is preferably at most ten times as large as the other coefficient). When two resin materials having mutually different thermal expansion coefficients are used, the thermal expansion coefficient of the conductive resin material is preferably smaller than that of the insulating resin material. This is because if the surface of the conductive members is lower than that of the interlevel dielectric layer, then the electrodes to be formed thereon may not be electrically connected with good stability as described above. The conductive members are preferably made of a conductive resin obtained by dispersing carbon fine particles in an acrylic resin, for example, and preferably has a thermal expansion coefficient of about $2 \times 10^{-5}$ cm/cm·° C. On the other hand, the interlevel dielectric layer is preferably made of an acrylic insulating resin having a thermal expansion coefficient of about $5 \times 10^{-5}$ cm/cm·° C.

After the undercoat film for the retro-reflective layer has been transferred onto the substrate on which the TFTs have been formed, the assembly is subjected to known process steps of washing, drying, baking and coating. In this manner, a TFT liquid crystal display device with retro-reflective electrodes is completed. Accordingly, the undercoat film for the retro-reflective layer should be sufficiently resistant to these process steps. More specifically, the undercoat film for the retro-reflective layer should have a low degree of swelling (or coefficient of water absorption) and should not be deformed significantly even under the heat, during a vacuum process or in any of various solvents. It is naturally necessary to control the process environments in such a manner as to achieve the desired coefficient of water absorption. Specifically, the undercoat film preferably has a water absorption coefficient of about 0.5 mass % or less, more preferably 0.2 mass % or less. The undercoat film preferably has a maximum allowable temperature (i.e., a temperature at or under which the undercoat film can maintain its shape) of at least about 150° C., more preferably about 200° C. or more. The vacuum process that the undercoat film for the retro-reflective layer should go through may be the process step of injecting a liquid crystal material in a vacuum, for example. The undercoat film should maintain its shape at a vacuum on the order of $10^{-3}$ Torr. Also, the undercoat film preferably has a sufficient resistance to an alcohol such as methanol, ethanol or isopropyl alcohol.

Hereinafter, another method of forming the undercoat film for the retro-reflective layer will be described with reference to FIGS. 9A through 9C.

Figure 9A:
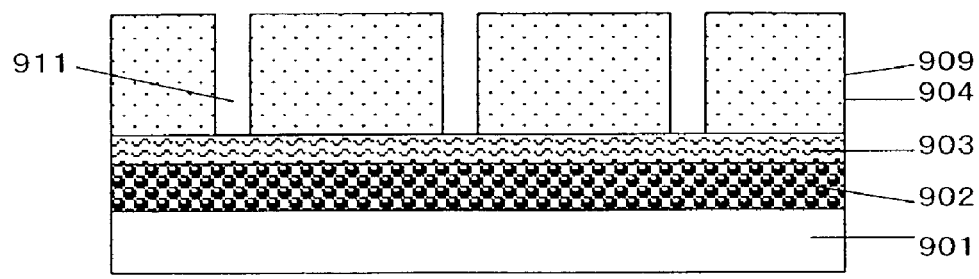
FIGS. 9A through 9C are cross-sectional views schematically showing respective process steps for preparing another transferable undercoat film for use to fabricate a reflective liquid crystal display device according to a preferred embodiment of the present invention.

First, as shown in FIG. 9A, a buffer layer 902 and a mold release layer 903 are stacked in this order on a base film 901. Next, an insulating layer 909 is deposited thereon so as to have openings 911 to be filled with conductive members 910.

Figure 9B:
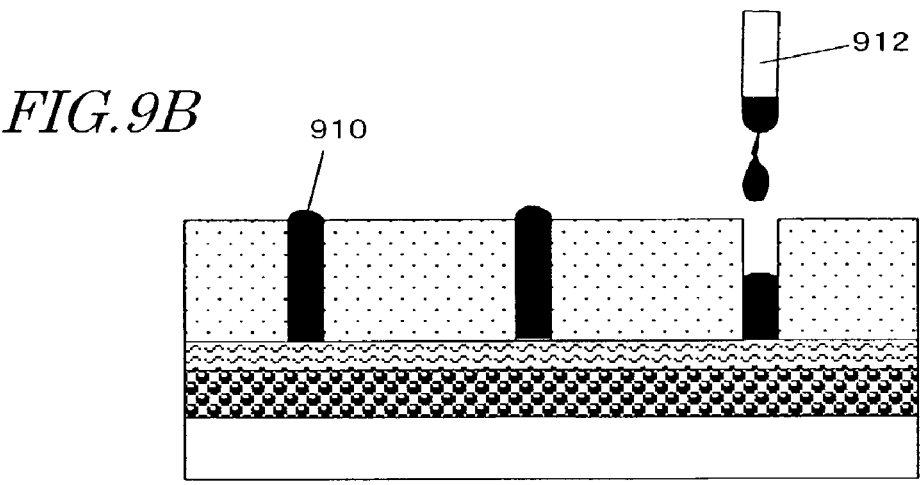
Figure 9C:
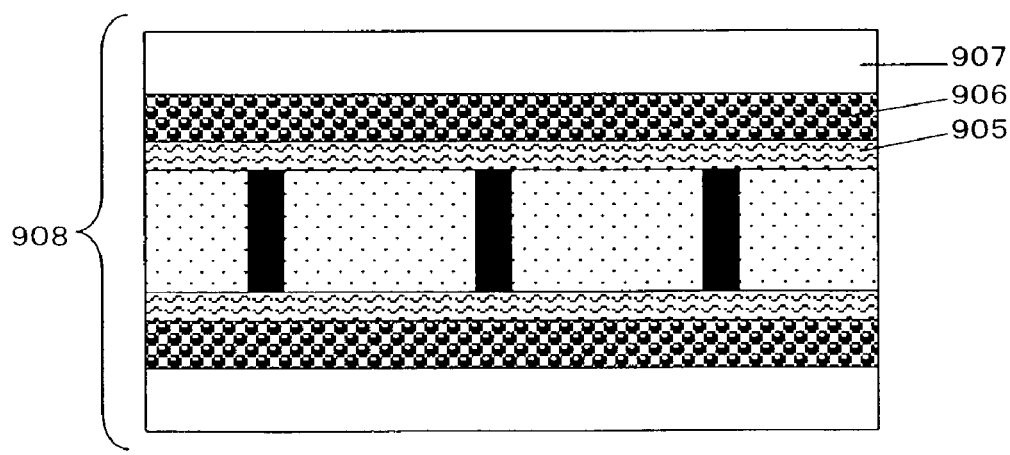

Subsequently, as shown in FIG. 9B, the openings 911 of the insulating layer 909 are filled with a conductive resin material by an inkjet process. In this manner, an undercoat film for a retro-reflective layer, including the insulating layer 909 and conductive members 910 in the same layer, can be obtained. Then, as shown in FIG. 9C, another mold release layer 905, another buffer layer 906 and a protective layer 907 are further formed thereon to obtain a multilayer structure 908 including the transferable undercoat film for a retro-reflective layer. Thereafter, the multilayer structure 908 obtained in this manner will be subjected to the same process steps as those already described.

This method is applicable for use to not just forming the film to be transferred but also forming the undercoat film directly over an active-matrix substrate. As another alternative, after the insulating layer 909 that already has the openings 911 to be filled with the conductive material has been transferred onto the active-matrix substrate, those openings 911 may be filled with the conductive material.

Hereinafter, yet another method of forming the undercoat film for the retro-reflective layer will be described with reference to FIGS. 10A through 10D.

Figure 10A:
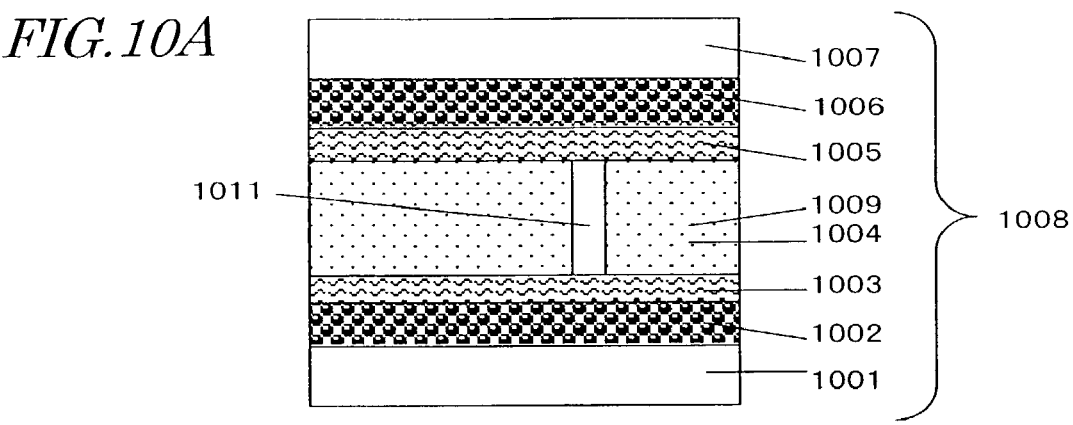
FIGS. 10A through 10D are cross-sectional views schematically showing respective process steps for forming an undercoat film for a retro-reflective layer for use to fabricate a reflective liquid crystal display device according to a preferred embodiment of the present invention.

First, as shown in FIG. 10A, a buffer layer 1002 and a mold release layer 1003 are stacked in this order on a base film 1001. Next, an insulating layer 1009 is deposited thereon so as to have openings 1011 to be filled with conductive members 1010.

Subsequently, without filling the openings 1011 of the insulating layer 1009 with the conductive material, another mold release layer 1005, another buffer layer 1006 and a protective layer 1007 are stacked in this order on the insulating layer 1009, thereby obtaining a multilayer structure 1008 including the transferable insulating layer 1009.

Figure 10B:
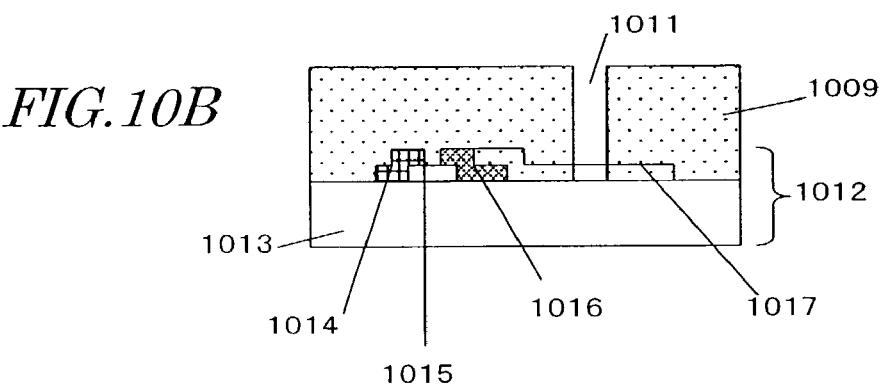

Next, the insulating layer 1009 is transferred onto an active-matrix substrate 1012 as shown in FIG. 10B.

Figure 10C:
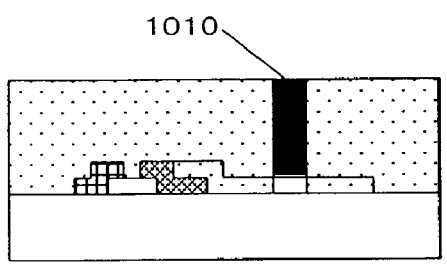
Figure 10D:
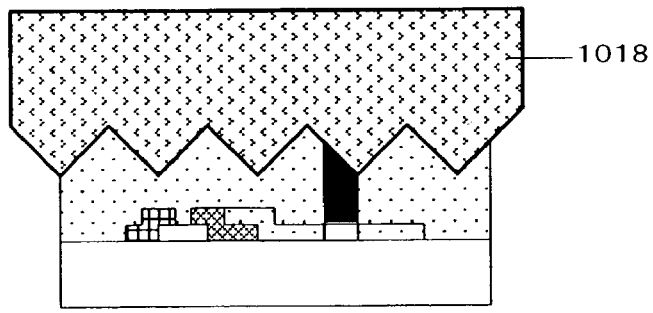
Figure 11A:
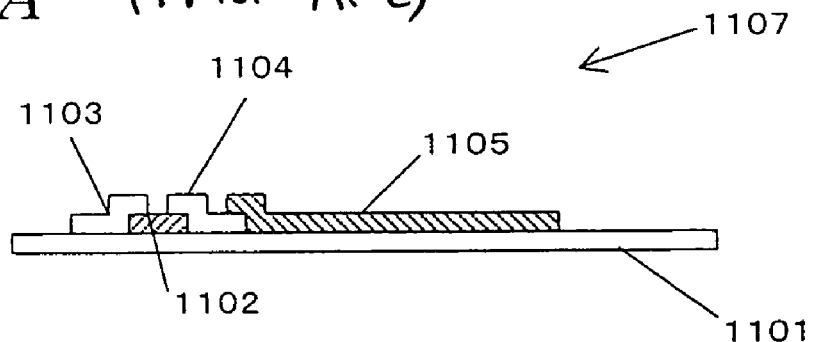
FIGS. 11A through 11D are cross-sectional views schematically showing a conventional method for forming a retro-reflective electrode.
Figure 11B:
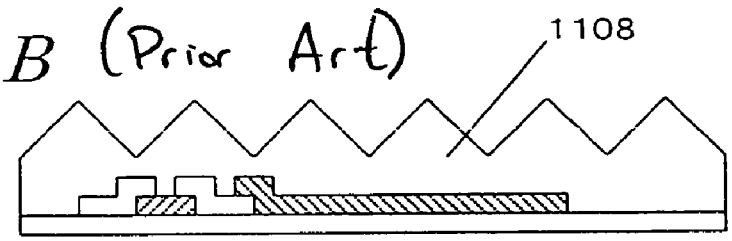
Figure 11C:
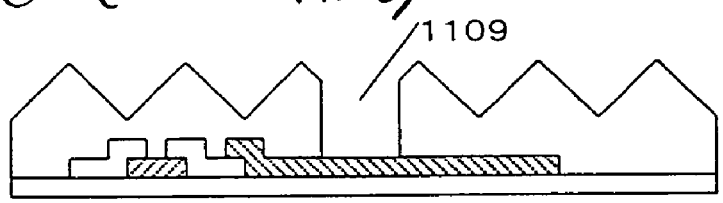
Figure 11D:
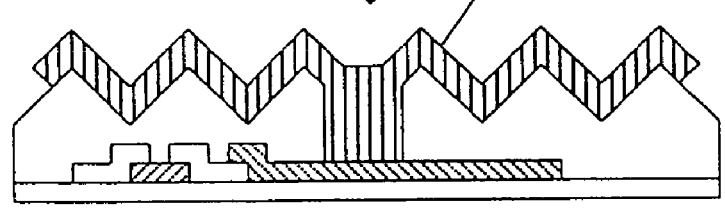
Figure 12A:
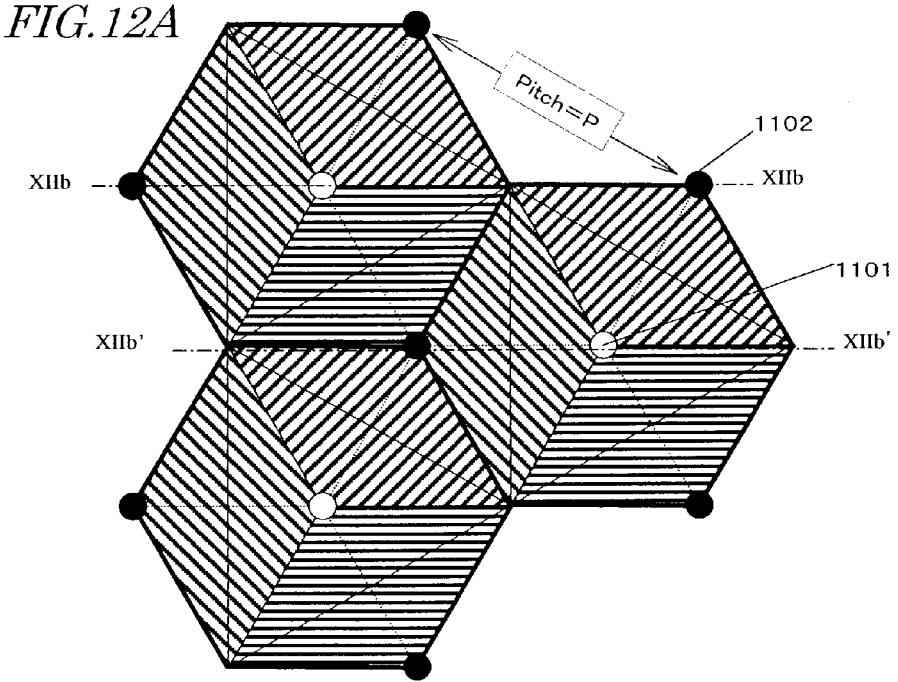
FIGS. 12A and 12B are respectively a plan view and cross-sectional views, taken on the planes XIIb-XIIb and XIIb'-XIIb' shown in FIG. 12A, showing the structure of an ideal retro-reflective layer.
Figure 12B:
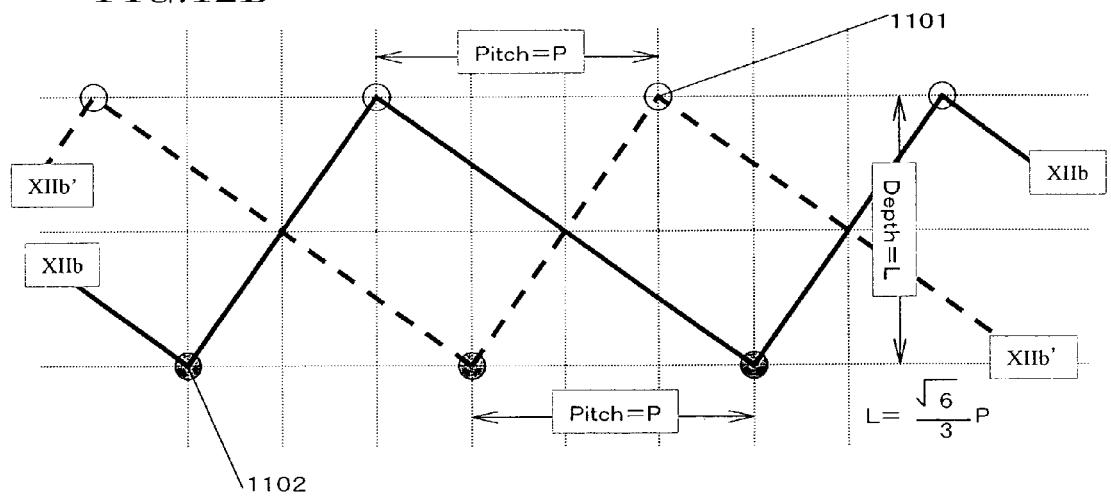

Thereafter, the active-matrix substrate 1012 on which the insulating layer 1009 has been transferred is immersed in an electrolytic polymerization solution, including a conductive resin, and then a voltage is applied from a source-bus line 1014 to a connector electrode 1017 by way of a transistor 1015 and a drain electrode 1016. Then, the conductive resin is deposited on the connector electrode 1017, which is exposed inside the opening 1011 of the insulating layer 1009, through an electrolytic polymerization reaction. As a result, the conductive member 1010 is formed as shown in FIG. 10C. In this manner, the interlayer film including the interconnecting members and the interlevel dielectric layer can also be obtained. In this preferred embodiment, the conductive member 1010 is formed by an electrolytic polymerization process. Alternatively, the conductive member 1010 may also be formed by any other method of depositing the conductive material by utilizing an electric field (e.g., an electroplating process or an electrodeposition process).

According to such a method of depositing the conductive material by utilizing an electric field, the conductive material can be deposited on the surface of the drain electrode 1016 or connector electrode 1017 first. Thus, electrical continuity between the conductive material and the drain electrode 1016 or the connector electrode 1017 is realized just as intended. A deposition process utilizing an electric field is particularly effective in forming a contact member on the active-matrix substrate.

Thereafter, the surface of the interlayer film is patterned into a predetermined shape by a stamping process using a mold 1018, thereby obtaining an undercoat film for a retro-reflective layer.

The preferred embodiments described above relate to a method of forming retro-reflective pixel electrodes. However, just by changing the predetermined surface shape to be defined, scattering reflective pixel electrodes may be easily formed, for example. Also, not just reflective electrodes but also transparent electrodes may be formed by the method of the present invention. Furthermore, the electrodes to be formed on the interlayer film do not have to be pixel electrodes but may also be other electrodes that are used to apply a voltage to a display medium layer such as a liquid crystal layer and that are electrically connected to a circuit element under the interlayer film.

Various preferred embodiments of the present invention described above improve the display quality of a display device, in which an electrode and a circuit element are electrically connected together by way of an interconnecting member formed in an interlevel dielectric layer. Among other things, a retro-reflective display device and a scattering reflective display device can have their display quality improved significantly by the present invention. Preferred embodiments of the present invention also provide a method for fabricating such a display device efficiently enough.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A display device comprising:
    a substrate;
    a circuit element, which is provided on the substrate;
    an interlayer film, which is provided over the circuit element and which includes an interlevel dielectric layer and an interconnecting member that runs through the interlevel dielectric layer; and
    an electrode, which is provided on the interlayer film,
    wherein the electrode and the circuit element are electrically connected together by way of the interconnecting member,
    wherein the electrode on the interlayer film has a concave-convex surface shape,
    wherein a surface of the interconnecting member and a surface of the interlevel dielectric layer have a continuous concave-convex shape thereby defining the concave-convex surface shape of the electrode, and wherein the electrode and the interconnecting member are made of different materials; and
    wherein the electrode has a retro-reflection property, and wherein a retro-reflection property of a concave portion of the electrode on the interconnecting member is substantially the same as that of a concave portion of the electrode on the interlevel dielectric layer.

2. The device of claim 1, wherein the electrode on the interlayer film exhibits a substantially uniform reflection property.

3. The device of claim 1, wherein the interconnecting member is made of a material that has a smaller thermal expansion coefficient than that of the interlevel dielectric layer.

4. The device of claim 1, wherein the interconnecting member and the interlevel dielectric layer are each made of a material including a resin.

5. The device of claim 4, wherein the resin is a thermosetting resin or a photo-curable resin.

6. The device of claim 5, wherein when cured, the resin included in the material of the interconnecting member shrinks less than the resin included in the material of the interlevel dielectric layer.

7. The device of claim 1, wherein the electrode is a pixel electrode, and wherein the display device further includes
    a counter electrode, which faces the pixel electrode, and
    a liquid crystal layer, which is provided between the pixel electrode and the counter electrode.

8. The device of claim 1, wherein at least part of the surface of the interconnecting member has a concave-convex surface shape.

9. A display device comprising:
    a substrate;
    a circuit element, which is provided on the substrate;
    an interlayer film, which is provided over the circuit element and which includes an interlevel dielectric layer and an interconnecting member that runs through the interlevel dielectric layer; and
    an electrode, which is provided on the interlevel dielectric layer and the interconnecting member,
    wherein the electrode and the circuit element are electrically connected together by way of the interconnecting member,
    wherein a surface shape of the interlevel dielectric layer and the interconnecting member is changed together so as to form a concave-convex upper surface in the interlayer film, so that at at least part of the concave-convex upper surface of the interlayer film the upper surfaces of the interlevel dielectric layer and the interconnecting member are both angled relative to horizontal at a substantially common angle so as to define a continuous angled surface portion of the interlayer film, and wherein the electrode and the interconnecting member are made of different materials; and
    wherein the electrode has a retro-reflection property, and wherein a retro-reflection property of a concave portion of the electrode on the interconnecting member is substantially the same as that of a concave portion of the electrode on the interlevel dielectric layer.

10. The device of claim 9, wherein the electrode on the interlayer film has a substantially uniform surface shape.

11. The device of claim 9, wherein the interconnecting member is made of a conductive resin including conductive particles dispersed therein.

12. The device of claim 9, wherein the electrode is a reflective pixel electrode of a liquid crystal display.

13. The device of claim 9, wherein at least part of the surface of the interconnecting member has a concave-convex surface shape.

14. The device of claim 9, wherein the interconnecting member and the interlevel dielectric layer are each made of a material including a resin.

* * * * *